(12) United States Patent
Kroskob

(10) Patent No.: US 11,337,373 B1
(45) Date of Patent: May 24, 2022

(54) BALE STACKER

(71) Applicant: Kroskob Manufacturing Inc, Merino, CO (US)

(72) Inventor: Brandon T. Kroskob, Merino, CO (US)

(73) Assignee: Kroskob Manufacturing Inc., Merino, CO (US)

( * ) Notice: Subject to any disclaimer, the term of this patent is extended or adjusted under 35 U.S.C. 154(b) by 0 days.

(21) Appl. No.: 17/100,014

(22) Filed: Nov. 20, 2020

(51) Int. Cl.
| | |
|---|---|
| *A01F 25/04* | (2006.01) |
| *B65G 57/28* | (2006.01) |
| *B66F 9/18* | (2006.01) |
| *A01D 90/10* | (2006.01) |
| *A01D 90/02* | (2006.01) |
| *B65G 67/04* | (2006.01) |

(52) U.S. Cl.
CPC .............. *A01F 25/04* (2013.01); *A01D 90/02* (2013.01); *A01D 90/10* (2013.01); *B65G 57/28* (2013.01); *B65G 67/04* (2013.01); *B66F 9/18* (2013.01); *B65G 2201/0202* (2013.01)

(58) Field of Classification Search
CPC ......... A01F 25/04; A01D 90/02; A01D 90/10; A01D 90/08; A01D 85/005; A01D 90/00; B65G 57/28; B65G 67/04; B65G 2201/0202; B65G 61/00; B66F 9/18; B60P 3/00; A01B 51/00; B65F 3/02; B65F 3/04; B65F 3/28
USPC .......................................... 414/24.5, 111, 132
See application file for complete search history.

(56) References Cited

U.S. PATENT DOCUMENTS

| | | | | |
|---|---|---|---|---|
| 2,602,554 | A * | 7/1952 | Griffith ................... | B65G 47/22 198/434 |
| 3,260,380 | A * | 7/1966 | Skromme .............. | A01D 90/08 414/789.4 |
| 3,826,389 | A * | 7/1974 | Godfrey ................. | A01D 90/08 414/802 |
| 3,927,771 | A * | 12/1975 | Butler .................... | A01D 90/08 414/501 |
| 4,289,435 | A * | 9/1981 | Boirin .................... | A01D 90/08 414/789.3 |
| 5,758,481 | A * | 6/1998 | Fry ........................ | A01D 90/08 56/480 |
| 5,813,814 | A * | 9/1998 | Smart .................... | A01D 90/08 414/111 |
| 6,364,591 | B1 * | 4/2002 | Stevenson ............. | A01D 90/08 414/111 |
| 6,499,922 | B2 * | 12/2002 | Coray ...................... | B60P 3/41 410/34 |

(Continued)

Primary Examiner — Gregory W Adams
(74) *Attorney, Agent, or Firm* — Craig R. Miles; CR Miles P.C.

(57) ABSTRACT

A bale stacker and method of using a bale stacker for consolidating a plurality of bales into a bale stack. The bale stacker including a bale stacker chassis supported for translational motion over a surface and one or more: of a bale lift, a bale receiving platform disposed over the bale stacker chassis to receive bales released from the bale lift, a bale transfer table disposing a plurality of bales in bale stack, a bale stack bed having at least one fork movable to abut a bale stack on said bale stack bed, a bale shuffler operable to engage the bale stack to align the bales in the bale stack, and a bale stack push of operable to engage the bale stack disposed on said bale stack bed in primarily vertical orientation to push a plurality of bale stacks off from the bale stack bed.

2 Claims, 52 Drawing Sheets

(56) References Cited

U.S. PATENT DOCUMENTS

| | | | |
|---|---|---|---|
| 7,610,851 B1 | 11/2009 | Horst | |
| 7,887,275 B2 * | 2/2011 | Anderson | ............... A01D 90/08 |
| | | | 414/111 |
| 2007/0166132 A1 * | 7/2007 | Couture | ............. B62D 33/0207 |
| | | | 414/111 |

* cited by examiner

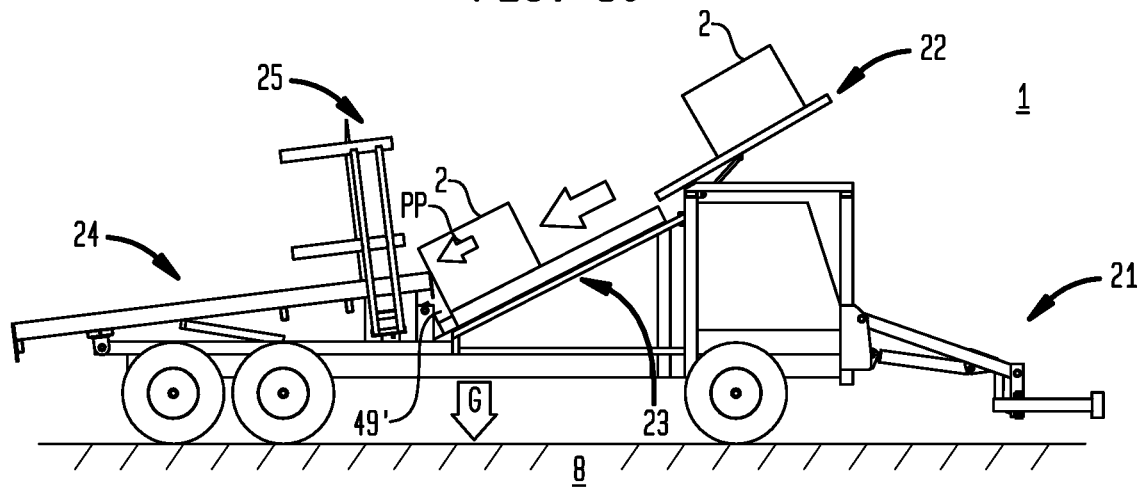
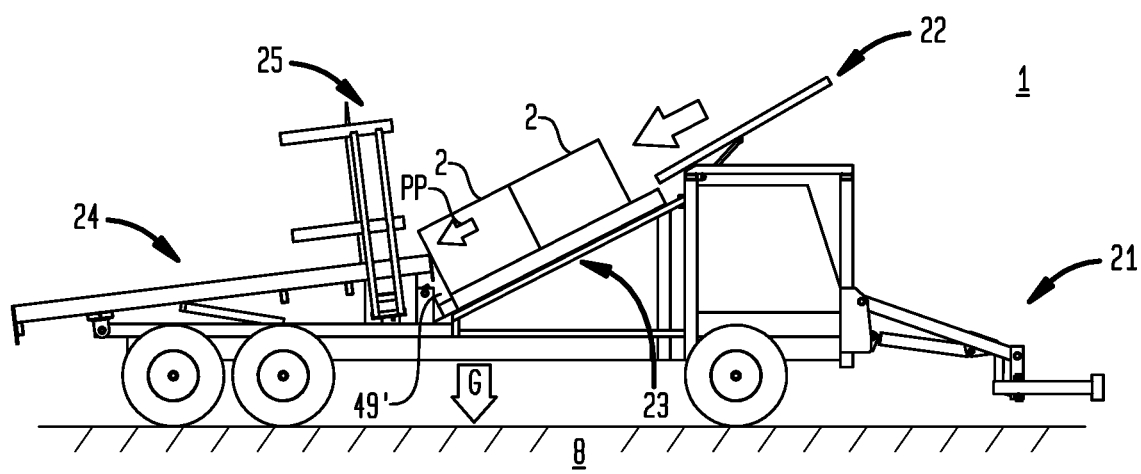

BALE STACKER

I. FIELD OF THE INVENTION

A bale stacker and method of using a bale stacker for consolidating a plurality of bales into a bale stack.

II. BACKGROUND OF THE INVENTION

Forage, such as hay and crop residue, such as corn stalks and straw of cereal plants, can be formed into bales having substantially uniform rectangular dimensions of bale length (L), bale width (W) and bale height (H). A bale has a bottom wall opposite a top wall each having substantially identical area of L×W, and having two opposite sidewalls, each having substantially identical area H×L, and having to opposite end walls, each having substantially identical area H×W. If the forage is to be transported or stored, the bales can be consolidated in a bale stack by abutting a bottom wall to a top wall and optionally further abutting bale stack side walls to consolidate a plurality of bale stacks into a bale bundle.

Bale stackers to consolidate bales into bale stacks are known; however, conventional machines have a number disadvantages in picking bales up, moving individual bales into a bale stack, aligning the bale walls in a bale stack, aligning stack walls in a plurality of bale stacks, or pushing bale stacks or bale bundles off from the bale stacker, which disadvantages can reduce the uniformity of the bale stack or bale bundle which can result in unstable bale stacks or bale bundles which may dissociate and require re-stacking, or damage or break open bales resulting in lost forage. Additionally, the disadvantages reduce the speed and capacity of the bale stacker.

There would be substantial advantages in a bale stacker which addressed the disadvantages in the conventional bale stacker resulting in more uniform bale stacks and bale bundles and increased speed and capacity of a bale stacker.

III. SUMMARY OF THE INVENTION

Accordingly, a broad object of the invention can be to provide a bale stacker and method of using a bale stacker for consolidating a plurality of bales into a bale stack. The bale stacker including a bale stacker chassis supported for translational motion over a surface, and including:

a bale lift having a pair of elongate lift arms pivotally coupled to the chassis front end by lift arm first ends and lift arm second ends rotatably coupled to a bale gripper head including a bale gripper crosspiece and a pair of bale gripper arms each including one elongate bar correspondingly pivotally coupled by gripper arm first ends to opposite bale gripper crosspiece ends and outwardly extending to terminate in a gripper arm second ends, the bale gripper head operable grip a bale and rotate to lift the bale from the surface, the pair of elongate arms rotatable from a primarily horizontal orientation to a primarily vertical orientation in relation to the bale stacker chassis;

a bale receiving platform disposed over the bale stacker chassis to receive bales released from said bale gripper head and rotate from a primarily horizontal orientation in relation to the bale stacker chassis toward an angle of up to about 50 degrees to cause the bale to slide off from said bale receiving platform;

a bale transfer table pivotally coupled to the bale stacker chassis and extending in an angled relation to the bale stacker chassis to receive a plurality of bales sliding off from the bale receiving platform in a bale stack on the bale transfer table, the bale transfer table rotatable to a primarily vertical orientation in relation to said bale stacker chassis to dispose the bale stack in primarily vertical orientation to the bale stacker chassis;

a bale stack bed having a bale stack bed first end pivotally coupled to the bale stacker chassis and extending at an angle of about twenty degrees to said bale stacker chassis with said bale stack bed second end disposed proximate and above said bale transfer table first end and at least one fork movable between the bale stack bed first end and said bale stack bed second end, whereby, the bale stack on said bale transfer table abuts said bale stack bed second end which acts a fulcrum on which the bale stack pivots as the bale transfer table rotates toward primarily vertical orientation to the bale stacker chassis, thereby disposing the bale stack onto the bale stack bed and abutting the at least one fork moved toward said bale stack bed second end;

a bale shuffler including a pair of bale shuffler arms pivotally coupled by bale shuffler arm first ends to opposite bale stacker chassis sides of the bale stacker chassis and upwardly extending on opposite bale stack bed sides proximate said bale stack bed first end to terminate in bale shuffler arm second ends, the pair of bale shuffler arms rotatable to decrease distance between said bale shuffler arm second ends to engage opposite bale sides of the bale stack to align the bale sides in the bale stack disposed on the bale stack bed and a plurality of bale shuffler cross members coupled in spaced apart angled relation to each of the pair of bale shuffler arms adapted to correspondingly engage a pair of bale stacks disposed on the bale stack bed to align bale stack sides of said pair of bale stacks; and a bale stack push off coupled to said bale stack bed, the bale push off extendable to engage the bale stack sides of a plurality of bale stacks disposed on said bale stack bed with the bale stack bed disposed in primarily vertical orientation to said bale stacker chassis with the at least one fork disposed proximate the surface, and to push the plurality of bale stacks off from the at least one fork to dispose the plurality of bale stacks on the surface.

Another broad object of the invention can be to provide a bale lift adapted to pivotally couple to a bale stacker, including a pair of elongate lift arms adapted to pivotally couple in spaced apart relation to a bale stacker chassis by lift arm first ends and outwardly extending from the chassis to terminate in lift arm second ends, the pair of elongate lift arms rotatable from a primarily horizontal orientation to a primarily vertical orientation in relation to the bale stacker chassis, and a bale gripper head, including a bale gripper crosspiece rotatably coupled to the lift arm second ends of the pair of elongate lift arms, and a pair of bale gripper arms each including one elongate bar having gripper arm first ends correspondingly pivotally coupled to opposite bale gripper crosspiece ends and outwardly extending from the bale gripper crosspiece ends to terminate in a gripper arm second ends, the pair of bale gripper arms rotatable to increase or decrease distance between the gripper arm second ends to grip a bale disposed on a surface between the pair of gripper arms, and the bale gripper crosspiece rotatable to lift the bale from the surface, and the pair of elongate lift arms rotatable to lift the bale over a bale receiving surface.

Another broad object of the invention can be to provide a bale stacker including a bale transfer table having a bale transfer table first end pivotally coupled to a bale stacker chassis of the bale stacker and extending in an angled relation to said bale stacker chassis to a bale transfer table second end, the bale transfer table receiving a plurality of bales which upon said bale transfer table into a bale stack, and a bale stack bed including a bale stack bed first end pivotally mounted proximate the bale stacker chassis and extending at an angle of about twenty degrees to the bale stacker chassis to dispose the bale stack bed second end proximate and above the bale transfer table first end to allow the bale stack bed second end to abut a bale stack disposed on the bale stack transfer table, thereby providing a fulcrum on which said bale stack pivots as the bale transfer table moves toward a primarily vertical orientation to the bale stacker chassis to dispose a bale stack proximate the bale stack bed second end, and optionally, further including at least one fork disposed in generally orthogonal relation to the bale stack bed movable between the bale stack bed first end and said bale stack bed second end to allow the at least one fork to abut the bale stack disposed on said bale stack bed.

Another broad object of the invention can be to provide a bale stacker including a bale shuffler including a pair of bale shuffler arms adapted to pivotally couple to opposite bale stacker chassis sides of a bale stacker chassis of the bale stacker, the pair of bale shuffler arms upwardly extending on opposite bale stack bed sides of a bale stack bed to terminate in bale shuffler arm second ends, the pair of bale shuffler arms pivotally coupled to opposite bale stacker chassis sides of said bale stacker each rotatable about a pivot axis by operation of a hydraulic cylinder to decrease distance between the bale shuffler arm second ends, the pair of bale shuffler arms engaging opposite bale sides of a bale stack to align a plurality of bale end walls in a bale stack, and optionally including, a plurality of bale shuffler cross members coupled in spaced apart angled relation to each of the pair of bale shuffler arms, the plurality of bale shuffler cross members adapted to correspondingly engage a pair of bale stacks disposed on said bale stack bed to align bale stack sides of a pair of bale stacks.

Naturally, further objects of the invention are disclosed throughout other areas of the specification, drawings, photographs, and claims.

IV. BRIEF DESCRIPTION OF THE DRAWINGS

FIG. 50 is a first side elevation view illustrating a method in which a particular embodiment of a bale receiving platform inclines to allow a second bale to slide from the bale receiving platform to a particular embodiment of a bale transfer table.

FIG. 51 is a first side elevation view illustrating a method in which a plurality of bales stack on a particular embodiment of a bale transfer table.

V. DETAILED DESCRIPTION OF THE INVENTION

Figure 1:
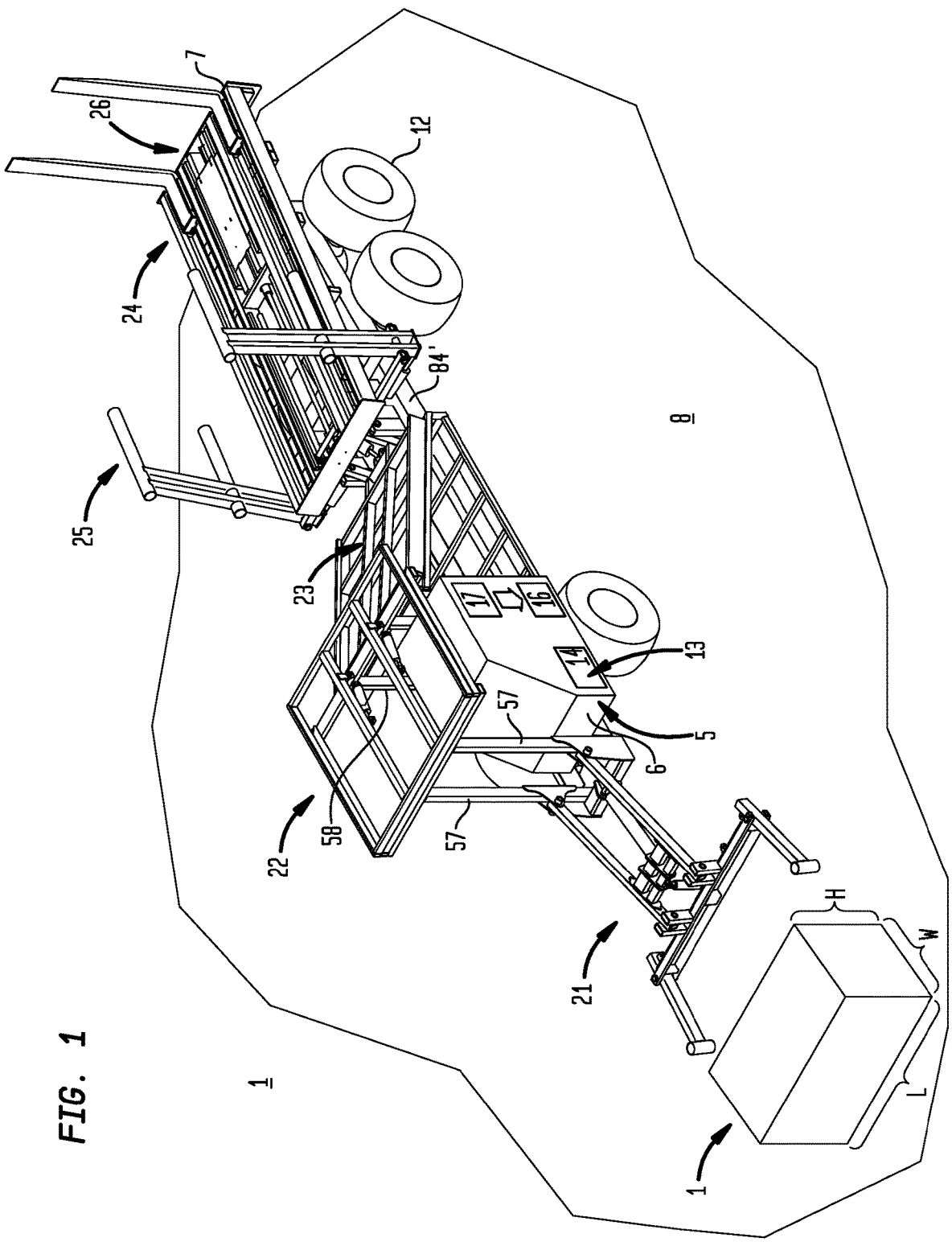
FIG. 1 is a front perspective view of a particular embodiment of a bale stacker.
Figure 2:
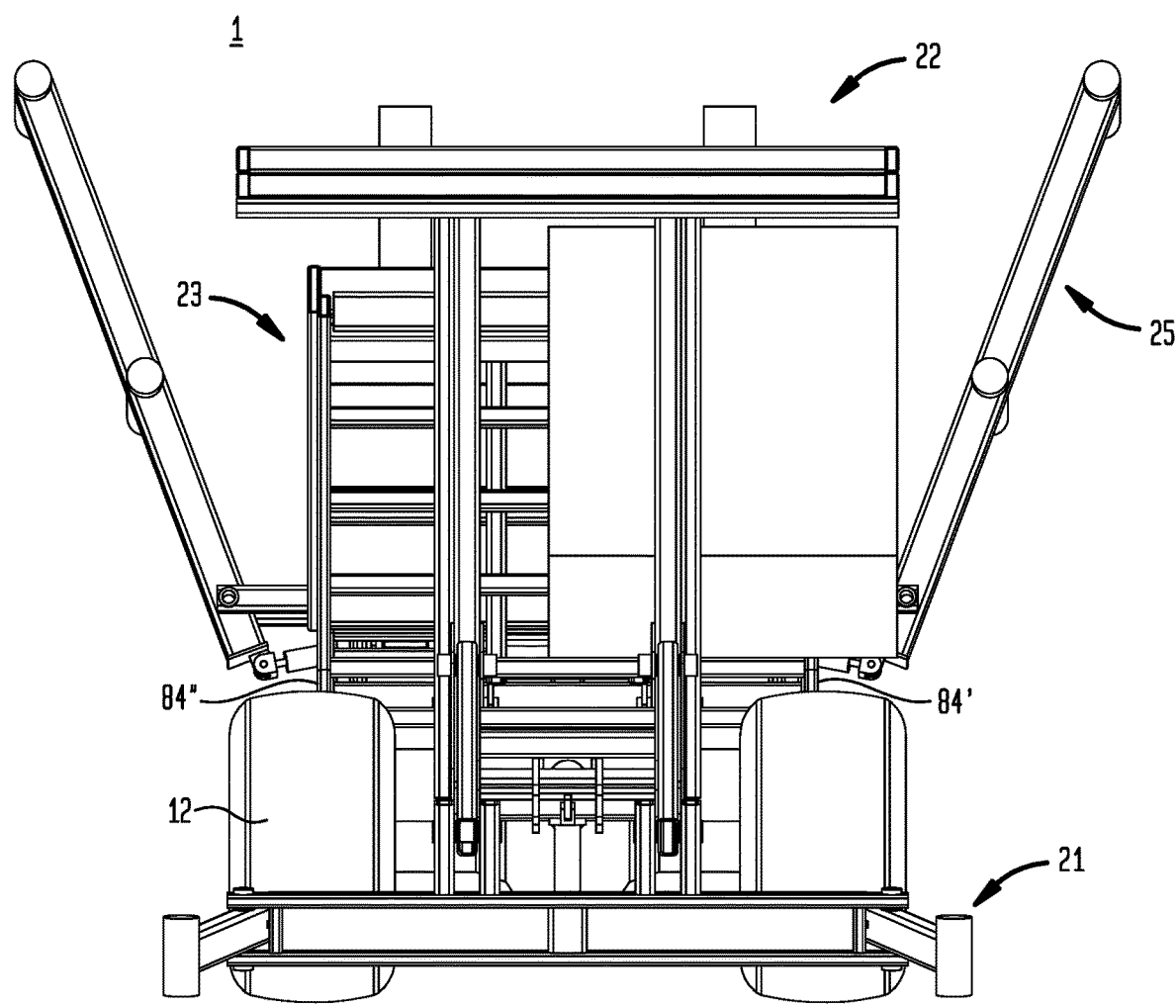
FIG. 2 is a front end elevation view of a particular embodiment of a bale stacker.
Figure 3:
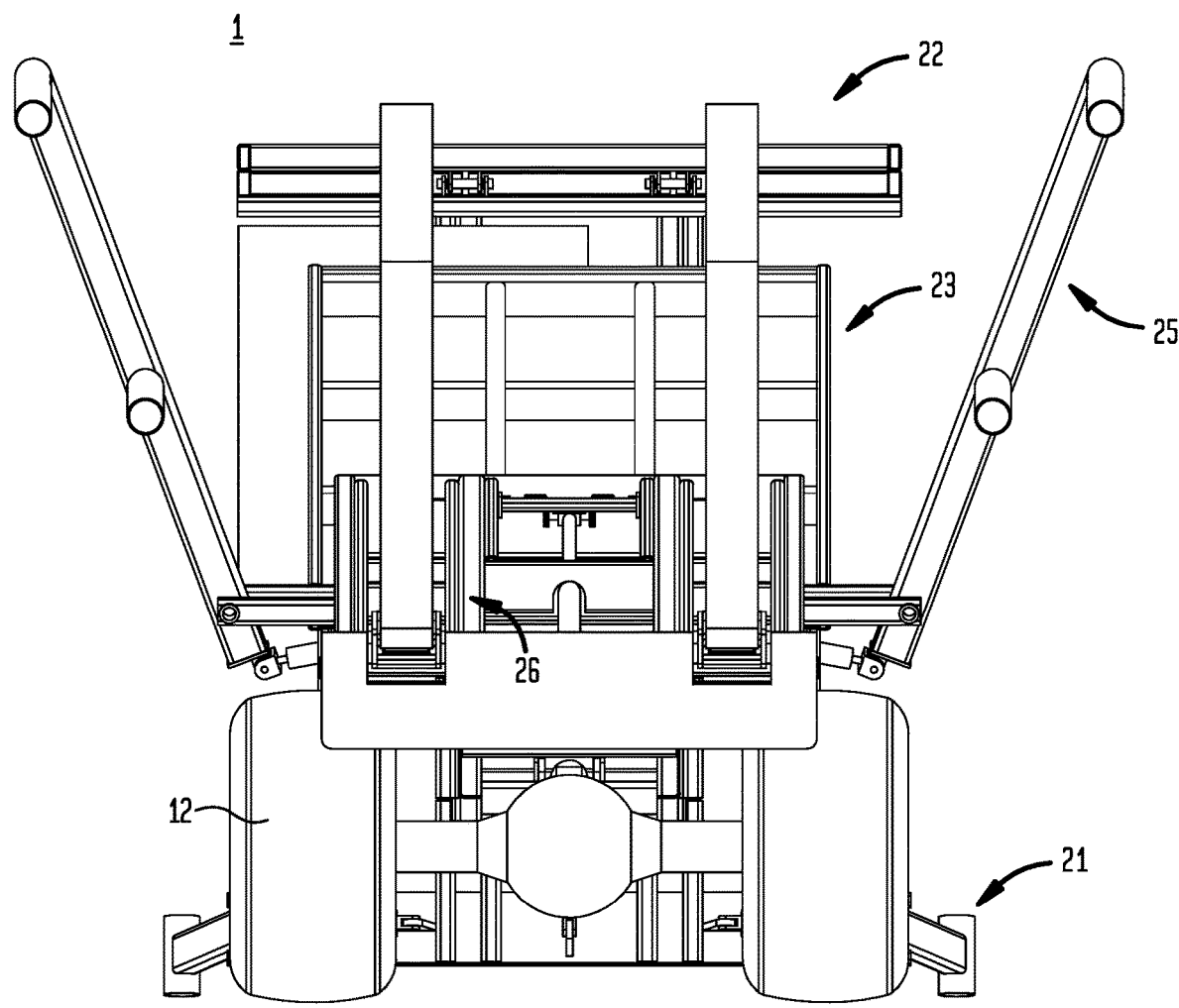
FIG. 3 is rear end elevation view of a particular embodiment of a bale stacker.
Figure 4:
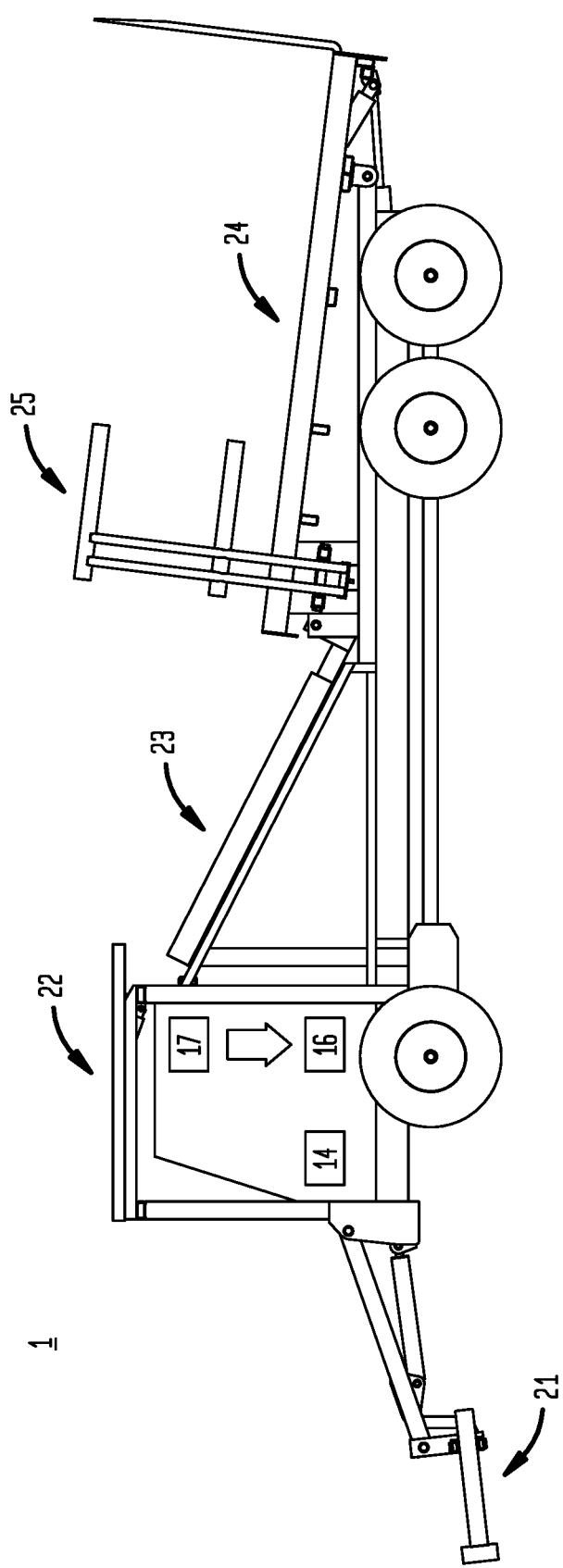
FIG. 4 is first side elevation view of a particular embodiment of a bale stacker.
Figure 5:
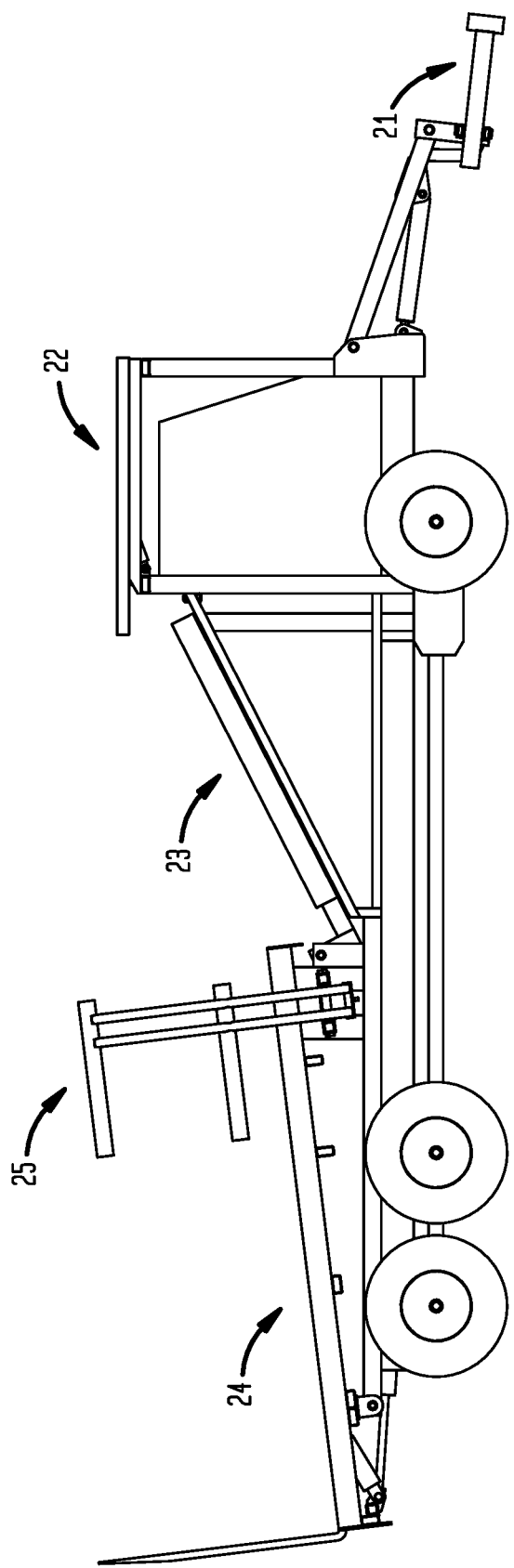
FIG. 5 is a second side elevation view of a particular embodiment of a bale stacker.
Figure 6:
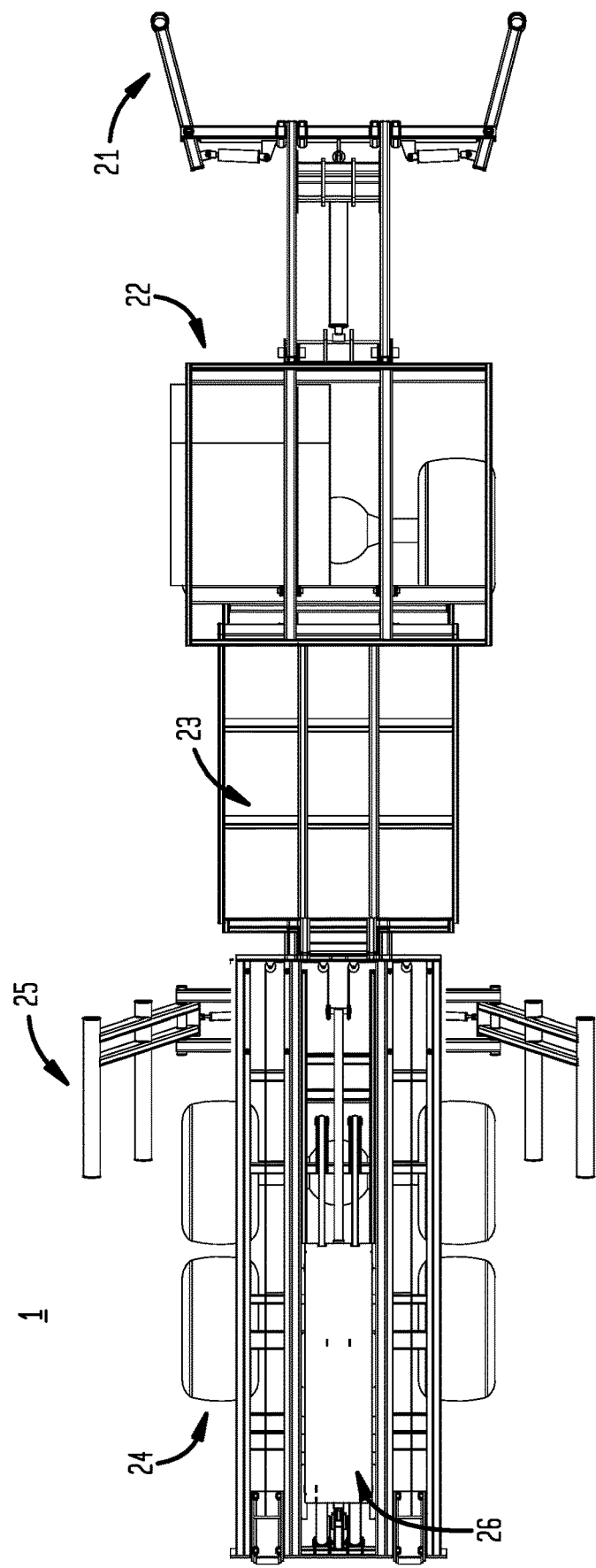
FIG. 6 is a top plan view of a particular embodiment of a bale stacker.
Figure 7:
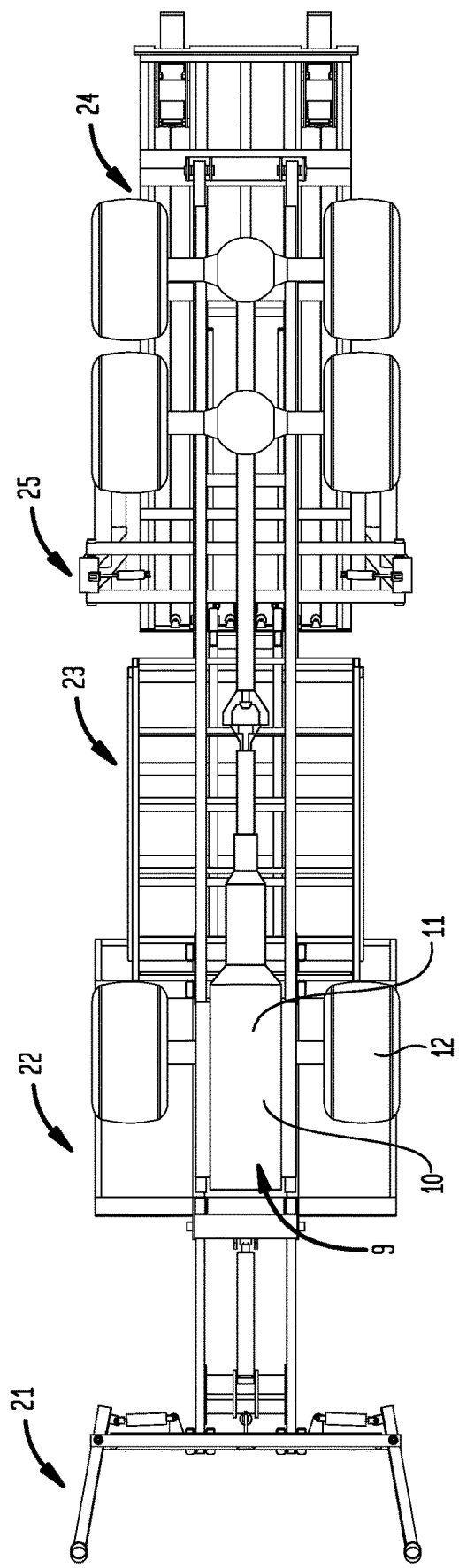
FIG. 7 is a bottom plan view of a particular embodiment of a bale stacker.
Figure 8:
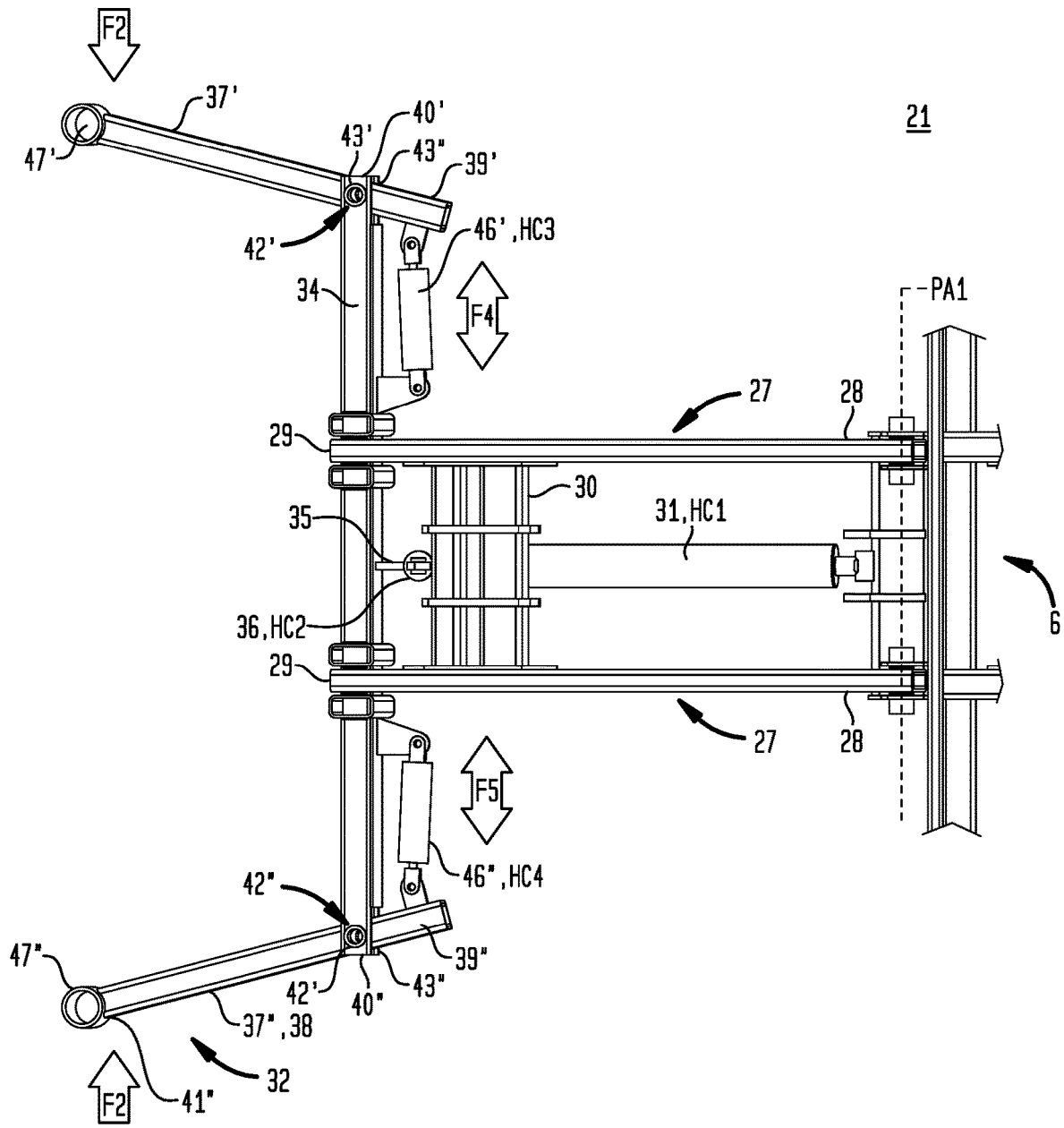
FIG. 8 is a top plan view of a particular embodiment of a bale lift.
Figure 9:
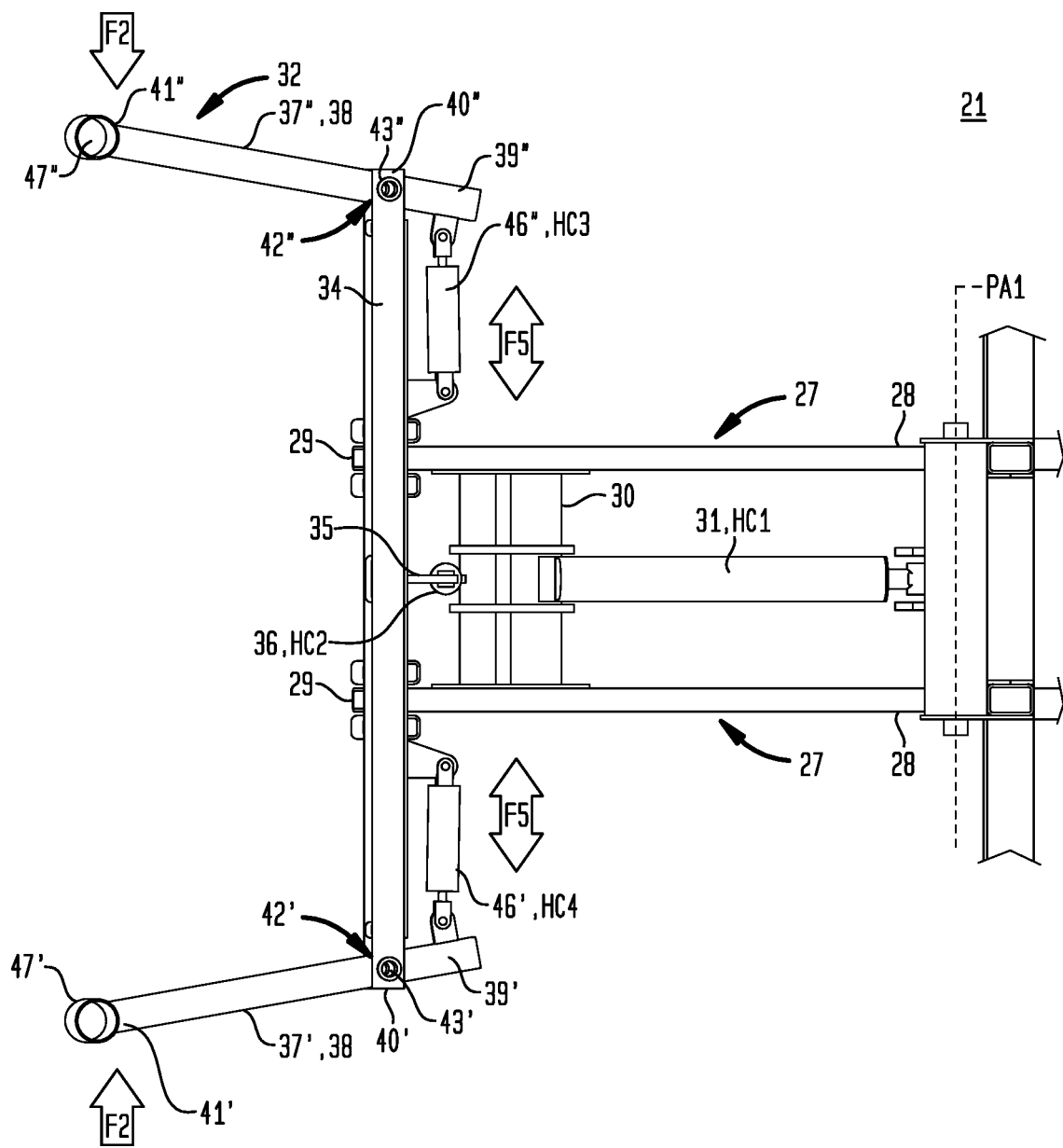
FIG. 9 is a bottom plan view of a particular embodiment of a bale lift.
Figure 10:
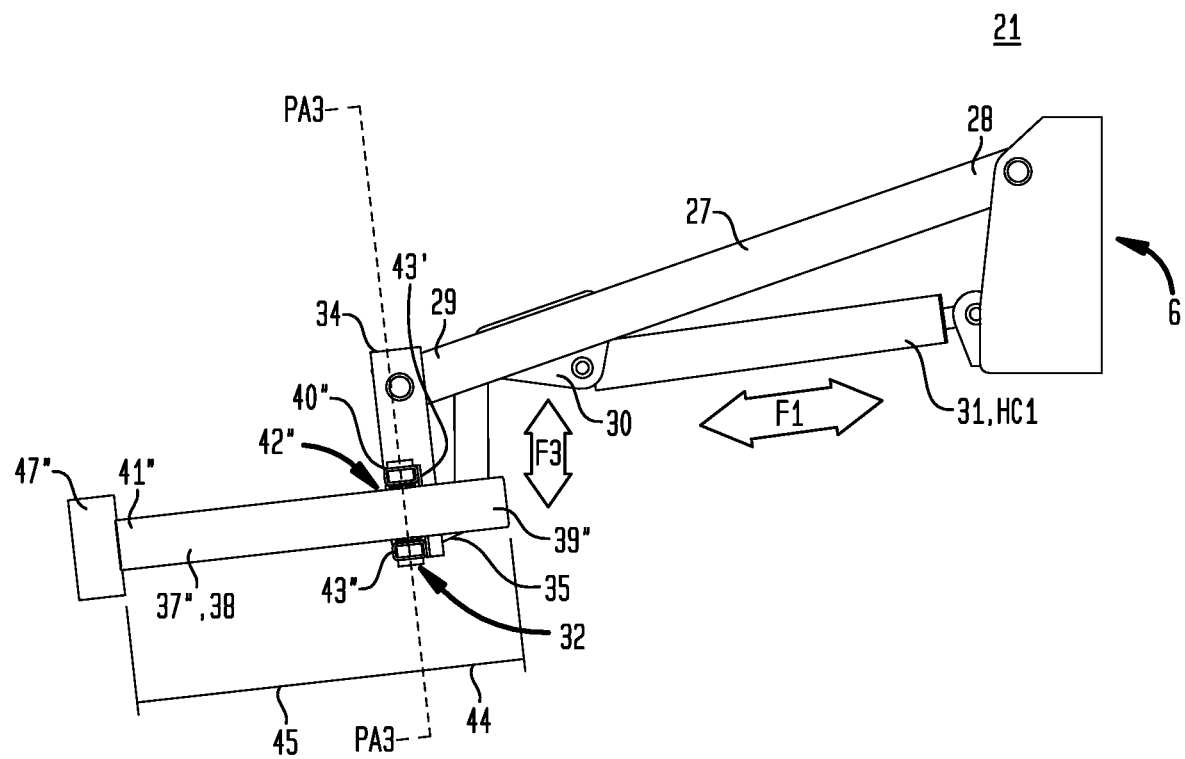
FIG. 10 is a first side elevation view of a particular embodiment of a bale lift.
Figure 59:
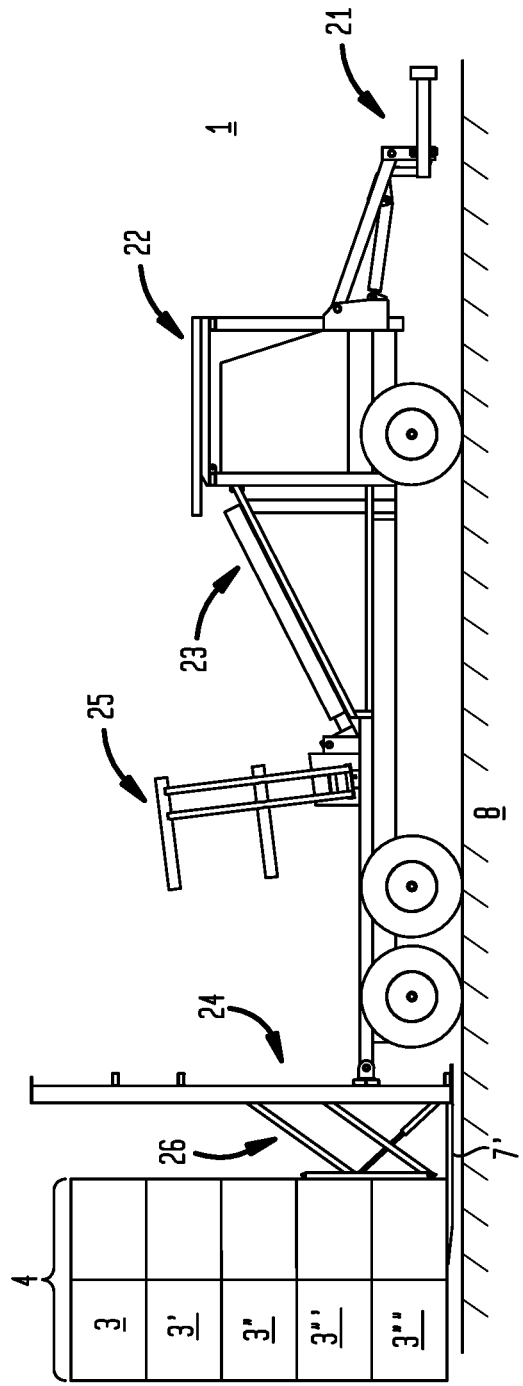
FIG. 59 is first side elevation view illustrating a method in which a particular embodiment of a bale push off outwardly extends to push a bale bundle off from the bale stack bed to a support surface.

Generally, reference is made to FIGS. 1 through 59, to describe embodiments of a bale stacker (1) and methods of using the bale stacker (1) for consolidating a plurality of bales (2) in a bale stack (3) or bale bundles (4). Embodiments of the bale stacker (1) include a bale stacker chassis (5) having a chassis front end (6) and a chassis rear end (7), the bale stacker chassis (5) supported for translational motion over a surface (8). The bale stacker chassis (5) can support a drive train (9) including an engine (10), a transmission (11) and a plurality of wheels (12) the components of which can be selected by those of ordinary skill in the art depending on environmental conditions and application parameters which condition operation of bale stacker (1). Embodiments can further include a hydraulic drive system (13) including a hydraulic pump (14) driven by an electric motor or the engine (10) of the bale stacker (1) and a plurality of hydraulic actuators (15) comprising a hydraulic motor (HM) or a hydraulic cylinder (HC) to drive particular components of the bale stacker (1), as further described herein. The components of the hydraulic drive system (13) can be selected by those of ordinary skill in the art depending on environmental and application parameters which condition operation of the component parts of the bale stacker (1). Embodiments can further include a controller (16) operable to control certain functions or movements of the drive train (9) or hydraulic drive system (13) of bale stacker (1) based on input from sensors (17) disposed to sense the movement or relative position of various components of the bale stacker (1), the bale stack chassis (5), or components thereof. The sensors (17) can include as illustrative examples: image sensor (camera), infrared sensor (infrared camera), accelerometer, capacitive or capacitive displacement sensors, doppler effect sensor, eddy current sensors, inductive sensors, magnetic sensors, photoelectric sensors, reflectivity sensors, infrared sensors, ultrasonic sensors, fiber optics sensor, hall effect sensors, touch switch, or combinations thereof. The controller (16) can comprise a mechanical controller, an electro-mechanical controller, or electronic controller, or combinations thereof, which can include a processor (18) in communication with a non-transitory computer readable media (19) containing a program (20) including program subroutines, modules, or partitions of the logic executable under control of the processor (18) to carry out functions of the program (20), controllers, logic control circuits, and other elements of embodiments may be shown in block diagram form. Moreover, specific implementations shown and described are exemplary only and should not be construed as the only way to implement the present disclosure unless specified otherwise herein. Additionally, block definitions and partitioning of logic between various blocks is exemplary of specific implementations; however, the present disclosure may be practiced by numerous other partitioning solutions. For the most part, details concerning timing considerations and the like have been omitted where such details are not necessary to obtain a complete understanding of the present disclosure by persons of ordinary skill in the relevant art. As used herein, "primarily horizontal" means more horizontal than vertical and "primarily vertical" means more vertical than horizontal in relation to the bale stacker chassis (5).

Again, with primary reference to FIGS. 1 through 7, the bale stacker (1) includes one or more of a bale lift (21), a bale receiving platform (22), a bale transfer table (23), a bale stack bed (24), a bale shuffler (25) and a bale push off (26) each of which can be made and used apart from the other components or used in various permutations and combinations in a bale stacker (1). In the illustrative examples provided by the Figures, the bale lift (21), the bale receiving platform (22), the bale transfer table (23), the bale stack bed (24), the bale shuffler (25) and the bale push off (26) are all incorporated into a particular illustrative embodiment of the bale stacker (1); however this is not intended to preclude embodiments that include only one, or fewer than all, or all of the bale lift (21), the bale receiving platform (22), the bale transfer table (23), the bale stack bed (24), the bale shuffler (25) and the bale push off (26).

The Bale Lift. For economic reasons, including reducing labor costs and storage requirements, forage or crop residues formed into small bales (2) has been largely replaced by larger bales (2) each weighing upwards of 2000 pounds. These large bales (2) left in the field must be lifted and transported individually or lifted for consolidation into bale stacks (3) or bale bundles (4); however, embodiments of the bale lift (21), the bale receiving platform (22), the bale transfer table (23), the bale stack bed (24), the bale shuffler (25) and the bale push off (26), whether individually or collectively in various permutations and combinations of a bale stacker (1) can be scaled for use with bales (2) having any particular H×L×W whether considered by those of ordinary skill in the art to be small bales (2) or large bales (2).

Figure 44:
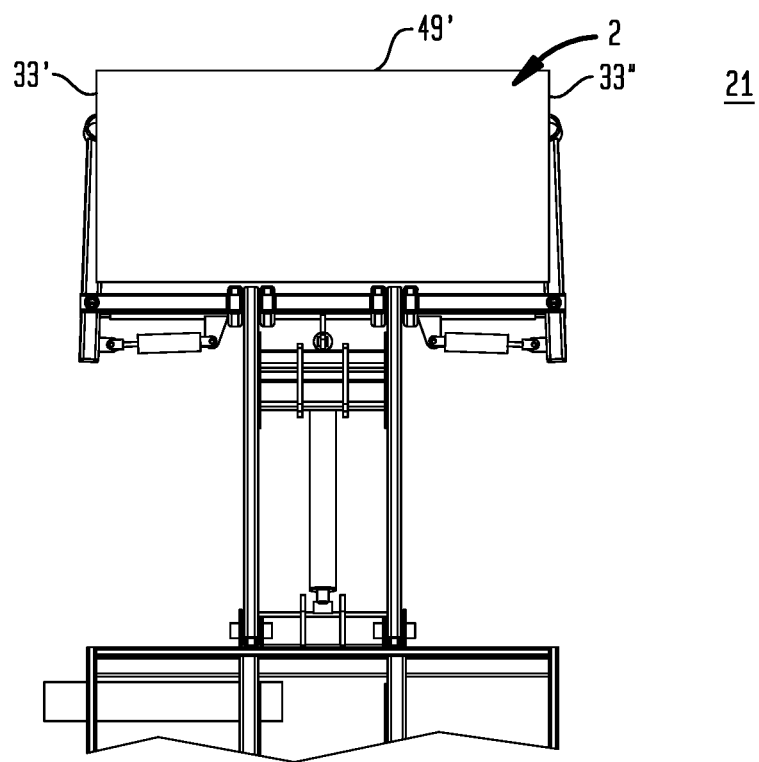
FIG. 44 is a top plan view illustrating of a method of gripping a bale with a particular embodiment of a bale gripper.
Figure 45:
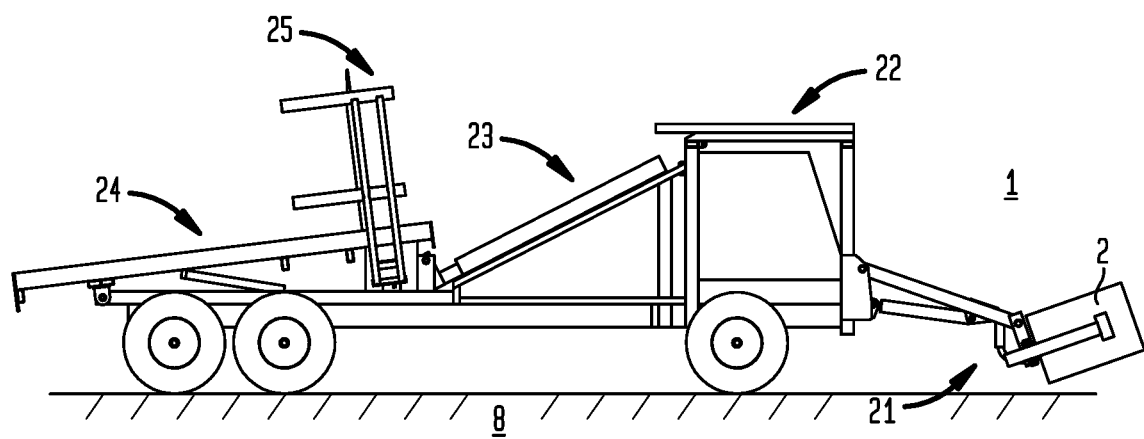
FIG. 45 is a first side elevation view illustrating a method of gripping a bale with a particular embodiment of a bale gripper.
Figure 46:
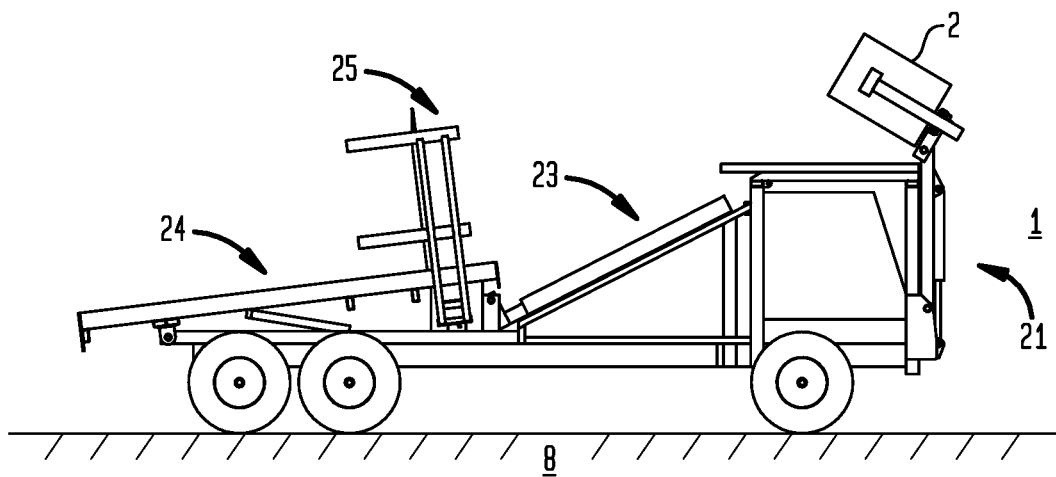
FIG. 46 is a first side elevation view illustrating a method of lifting a bale with a particular embodiment of a bale gripper to a position above a bale receiving platform.

Now, with primary reference to FIGS. 8 through 13, particular embodiments of the bale stacker (1) can, but need not necessarily, include a bale lift (21) including a pair of elongate lift arms (27) pivotally coupled in spaced apart relation to the chassis front end (6) of the bale stacker chassis (5) by lift arm first ends (28). The pair of elongate lift arms (27) can outwardly extend from the chassis front end (5) to terminate in lift arm second ends (29). The pair of elongate lift arms (27) can rotate about a pivot axis (PA1) from a primarily horizontal orientation relative to the bale stacker chassis (5)(as shown in the example of FIGS. 44 and 45) to a primarily vertical orientation in relation to bale stacker chassis (5) (as shown in the example of FIG. 46). The pair of elongate lift arms (27) can, but need not necessarily, comprise tubular steel members. A lift arm crossmember (30) can be disposed proximate lift arm second ends (29). In particular embodiments, a lift arm hydraulic actuator (31) in the form of a hydraulic cylinder (HC1) can be interposed between the chassis front end (6) and the lift arm crossmember (30) which by movement of a piston rod within a barrel of the hydraulic cylinder (HC1) generates push or pull force (F1) to correspondingly rotate the pair of elongate lift arms (27) about the pivot axis (PA1).

Figure 11:
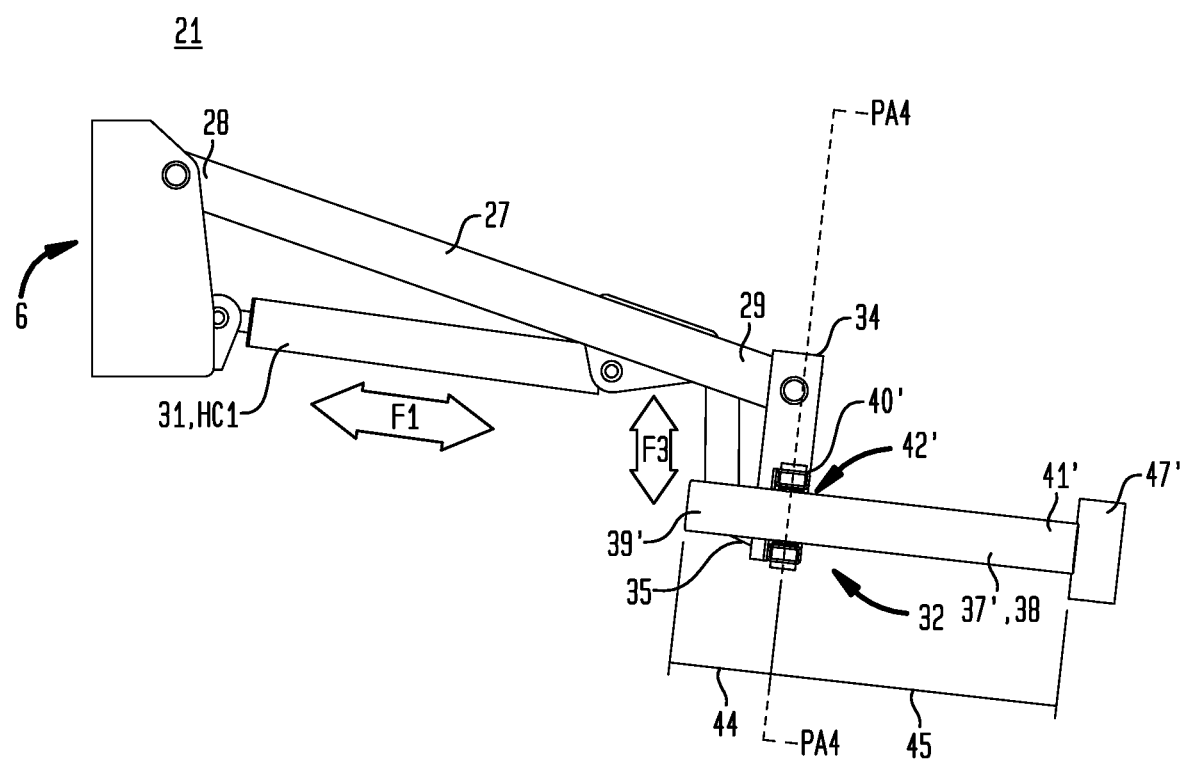
FIG. 11 is a second side elevation view of a particular embodiment of a bale lift.
Figure 12:
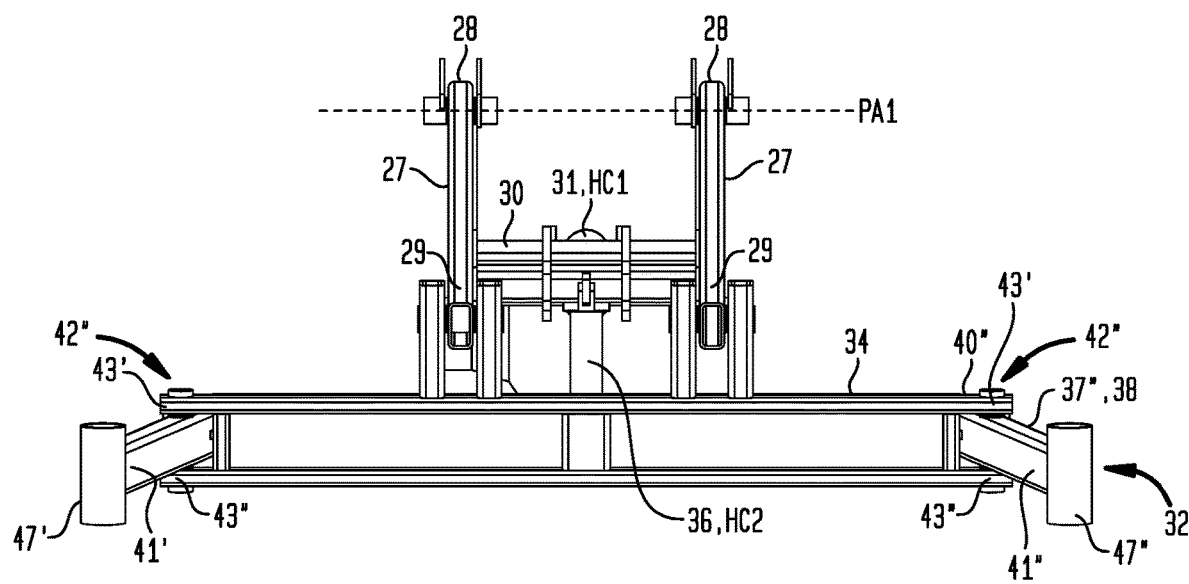
FIG. 12 is a front end elevation view of a particular embodiment of a bale lift.
Figure 13:
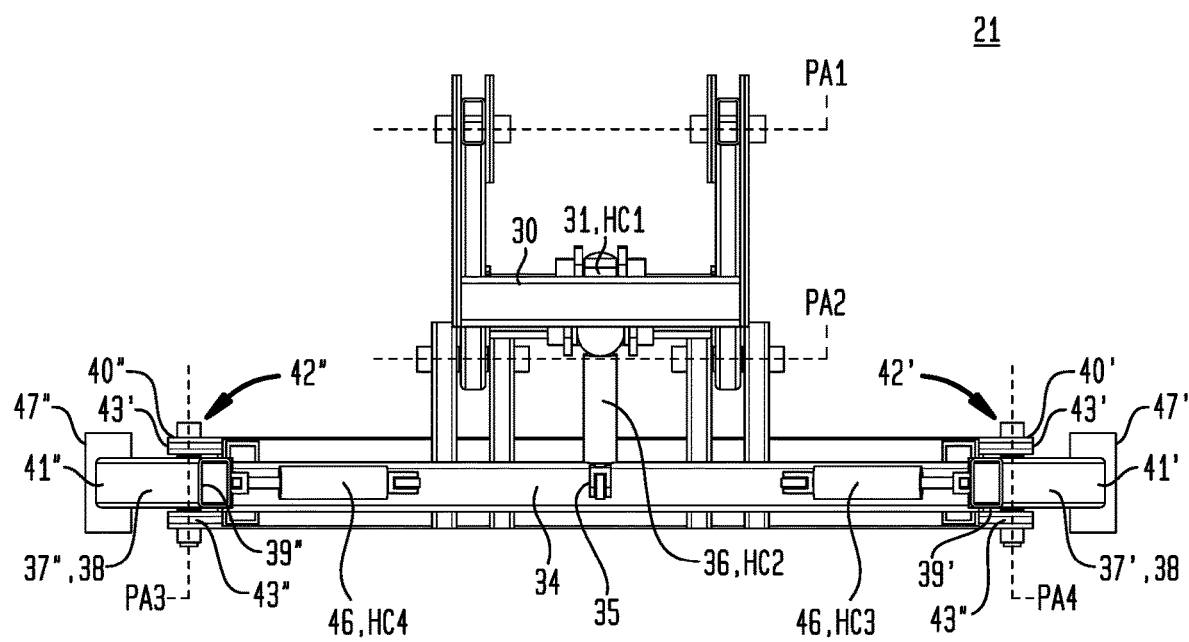
FIG. 13 is a rear end elevation view of a particular embodiment of a bale lift.
Figure 14:
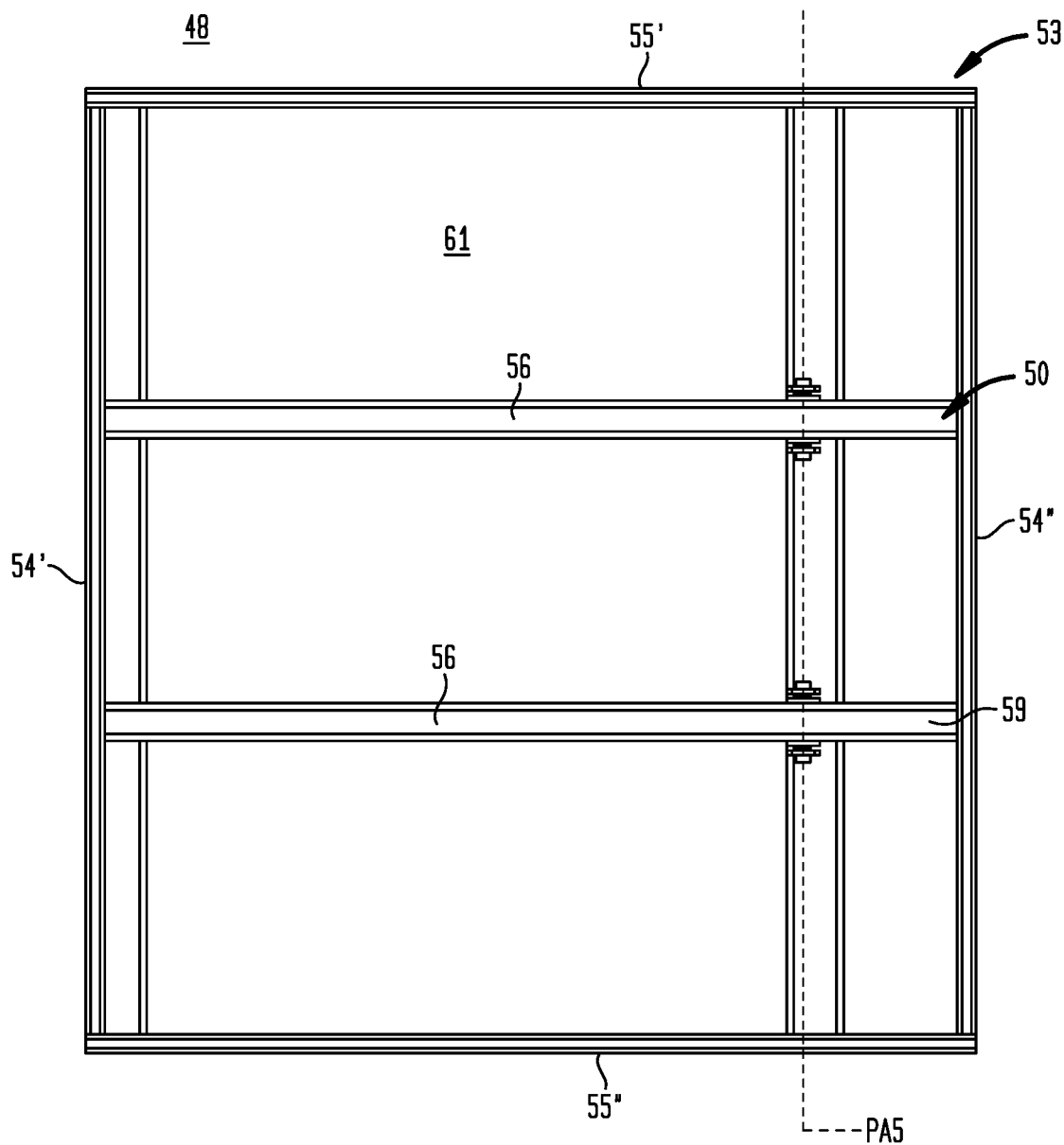
FIG. 14 is a top plan view of a particular embodiment of a bale receiving platform.
Figure 15:
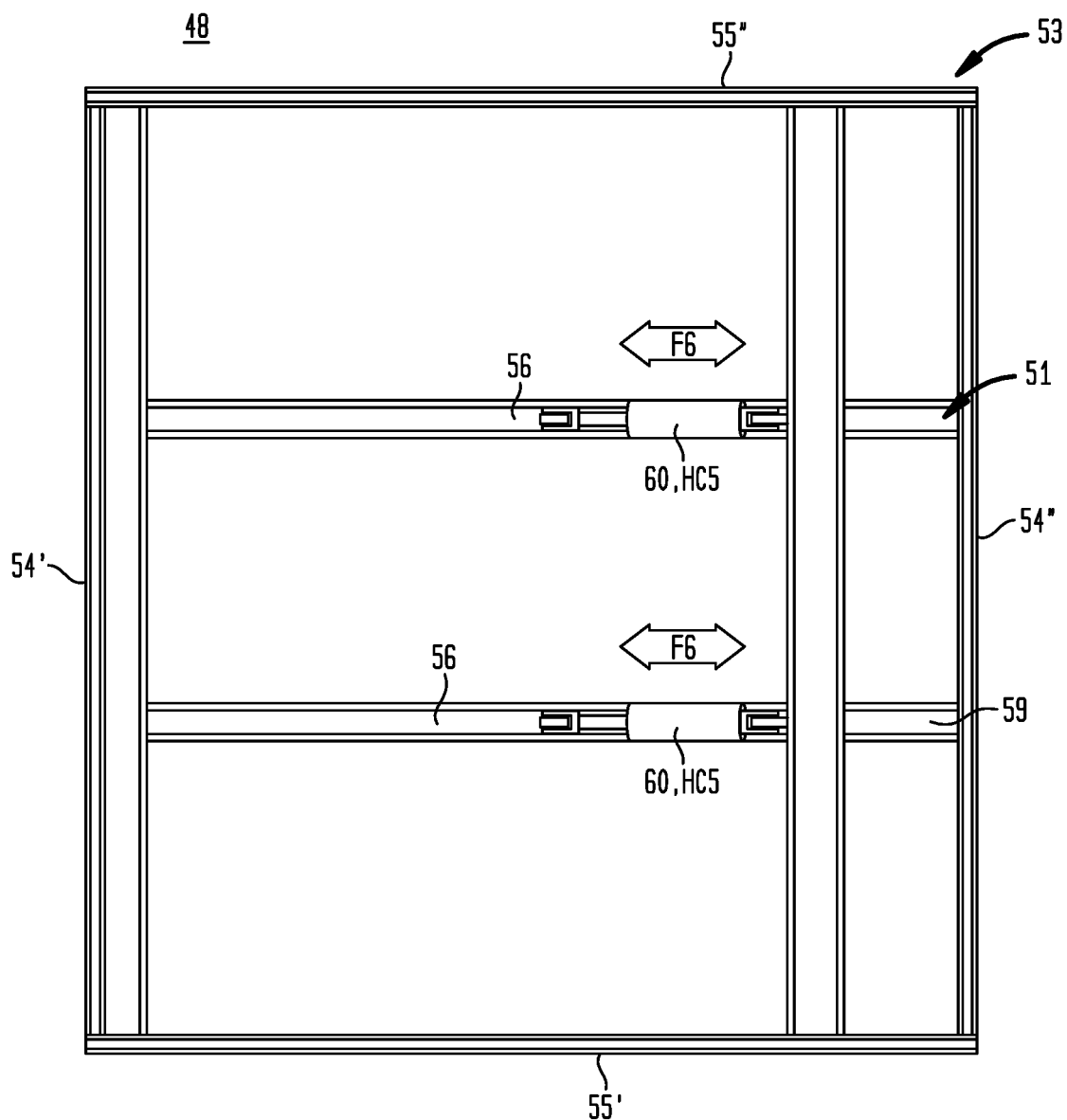
FIG. 15 is a bottom plan view of a particular embodiment of a bale receiving platform.
Figure 16:
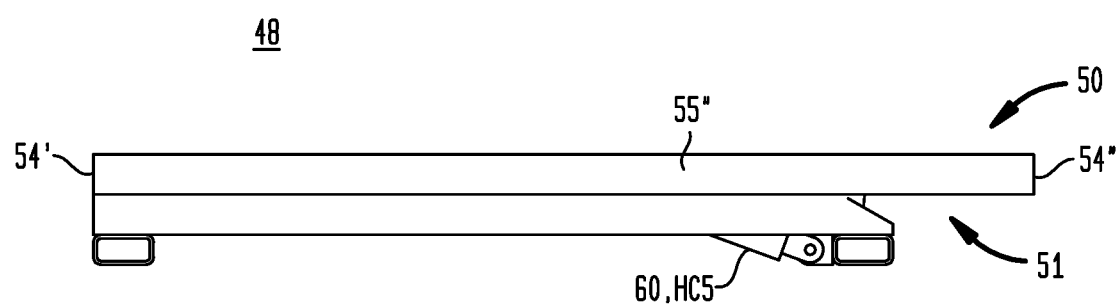
FIG. 16 is a first side elevation view of a particular embodiment of a bale receiving platform.
Figure 17:
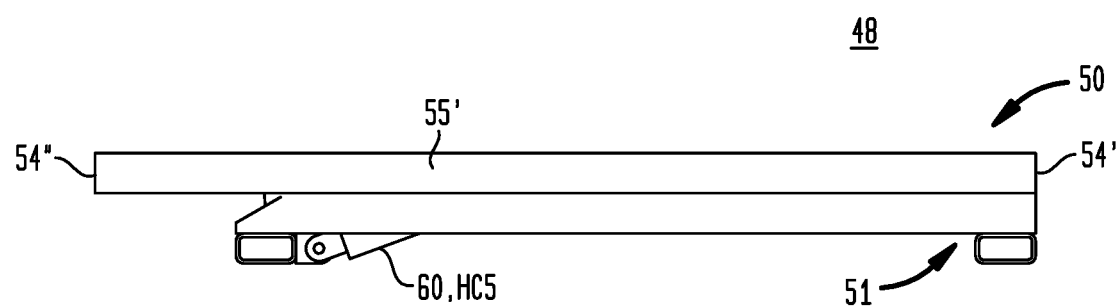
FIG. 17 is a second side elevation view of a particular embodiment of a bale receiving platform.
Figure 18:
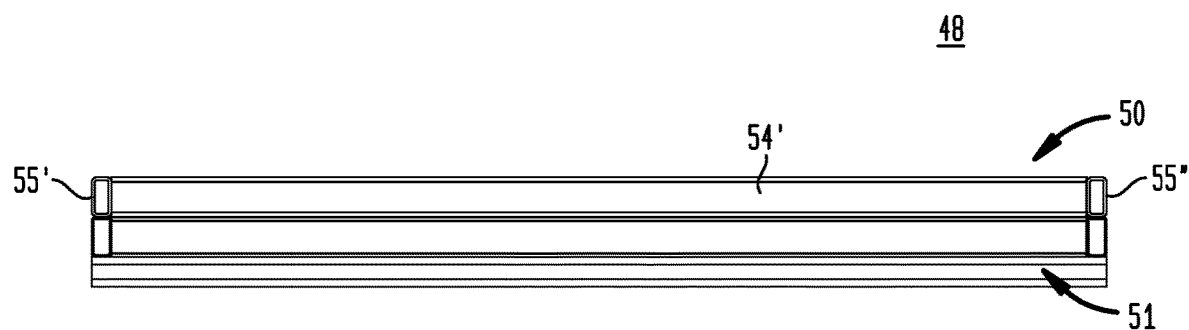
FIG. 18 is a front end elevation view of a particular embodiment of a bale receiving platform.
Figure 19:
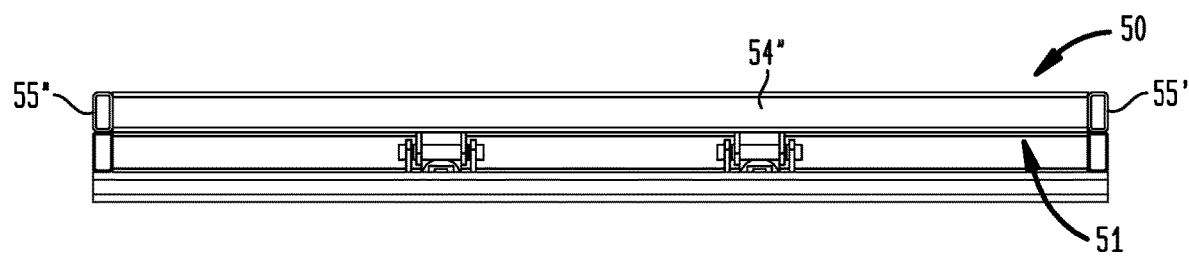
FIG. 19 is rear end elevation view of a particular embodiment of a bale receiving platform.
Figure 20:
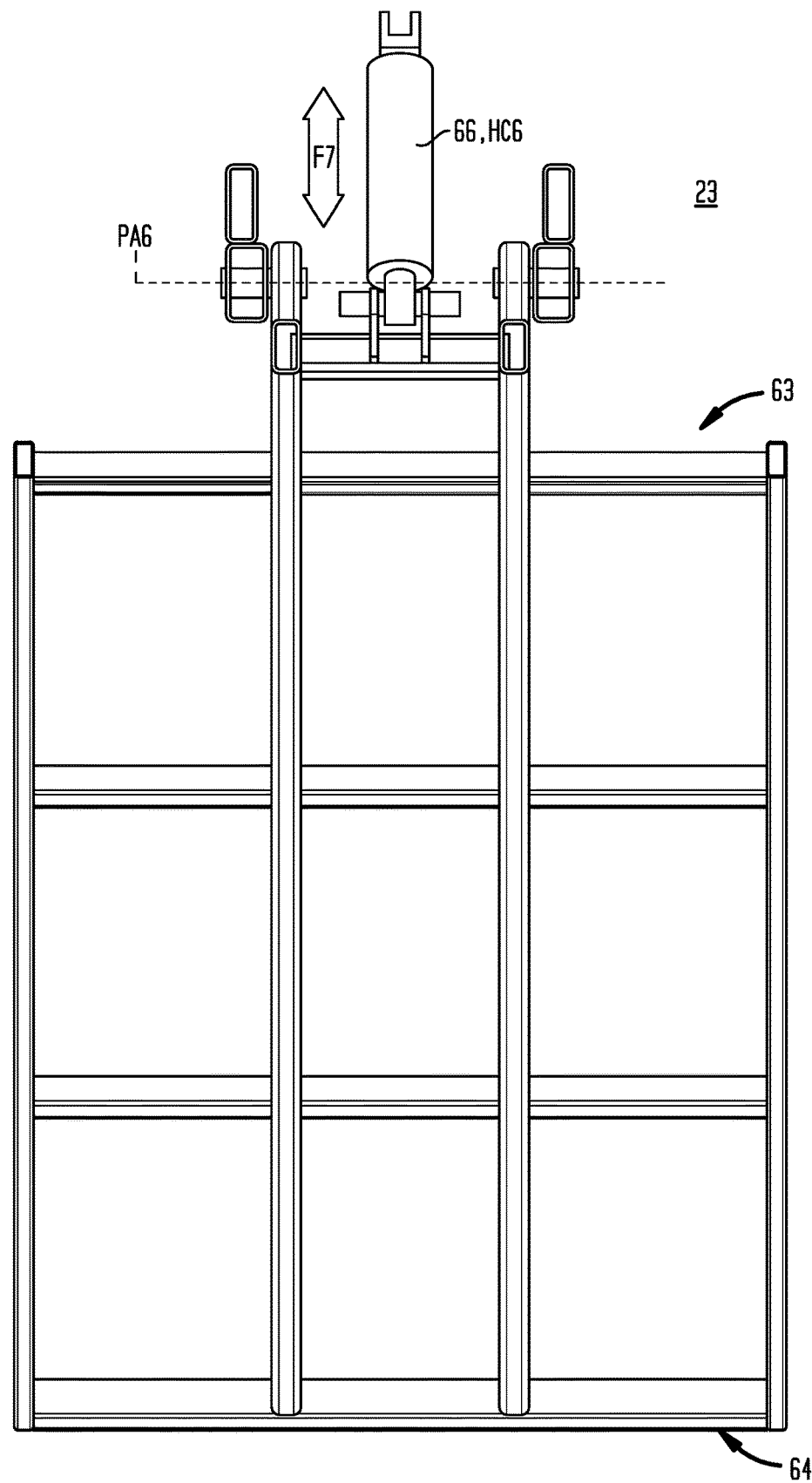
FIG. 20 is a top plan view of a particular embodiment of a bale transfer table.
Figure 21:
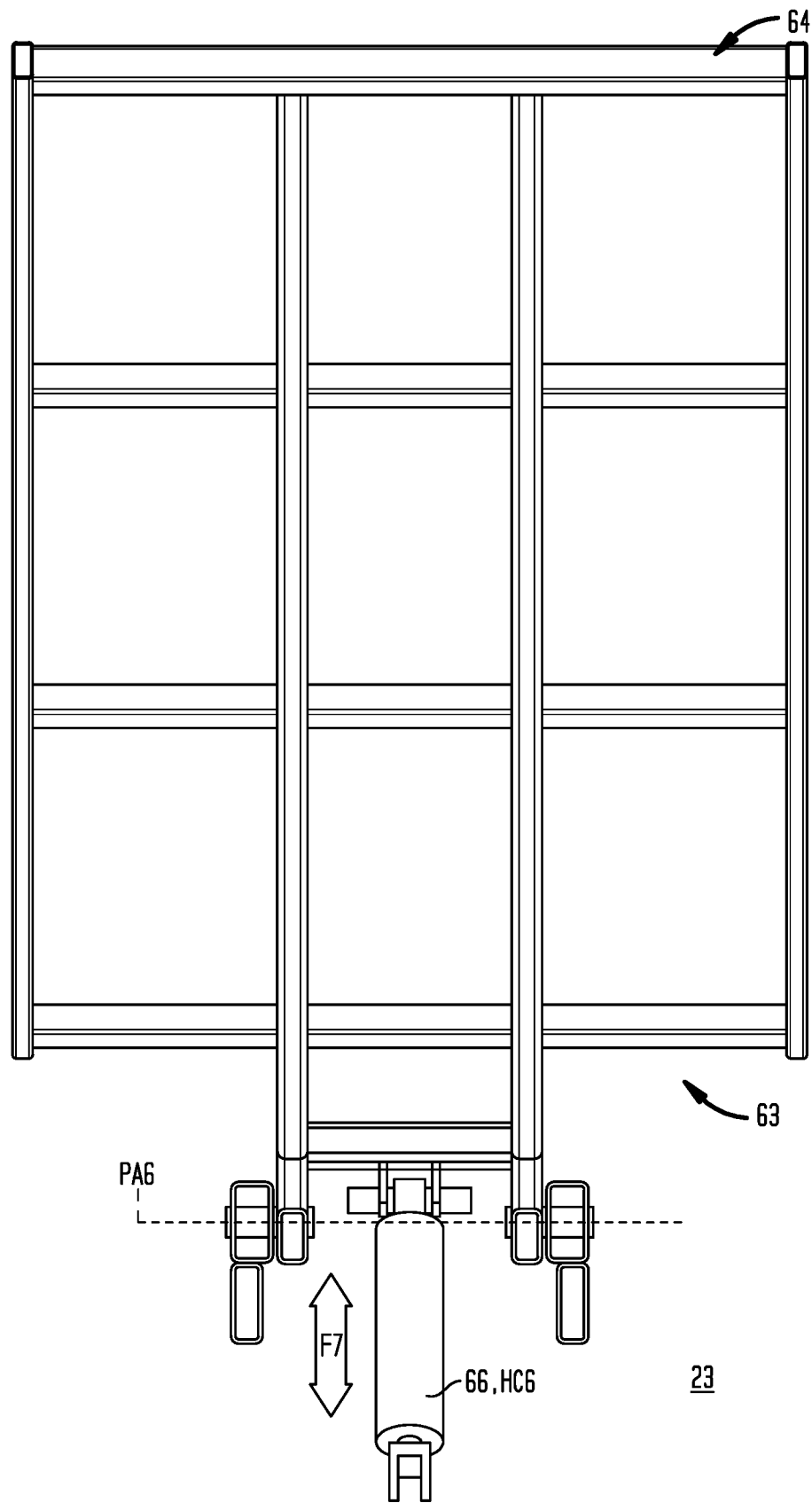
FIG. 21 is a bottom plan view of a particular embodiment of a bale transfer table.
Figure 22:
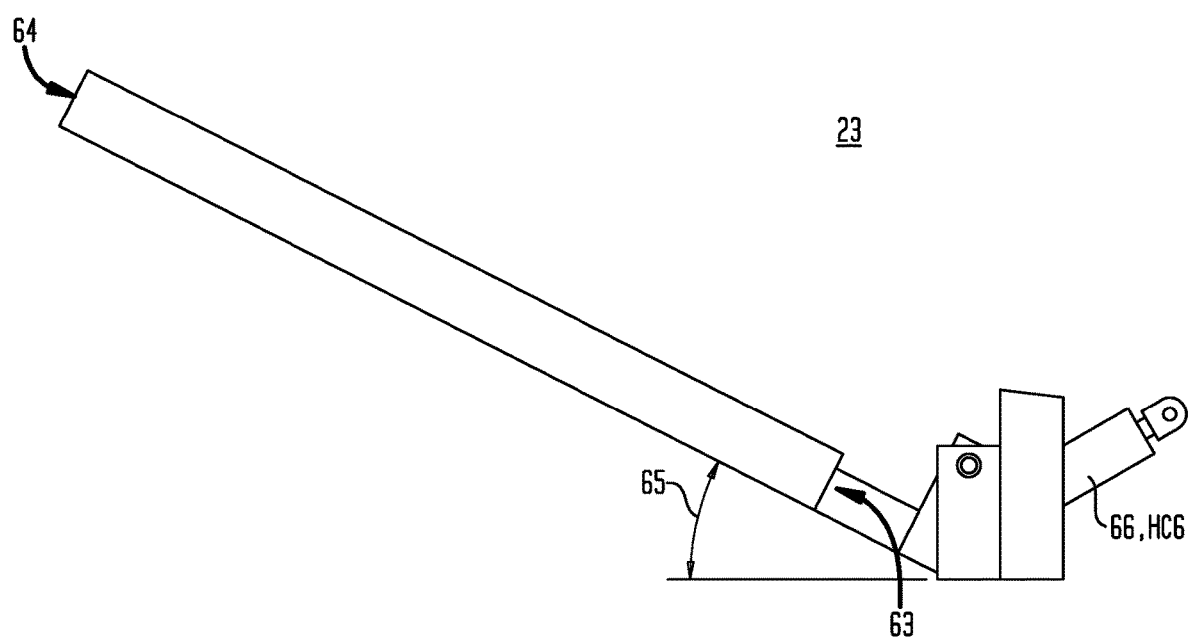
FIG. 22 is a first side elevation view of a particular embodiment of a bale transfer table.
Figure 23:
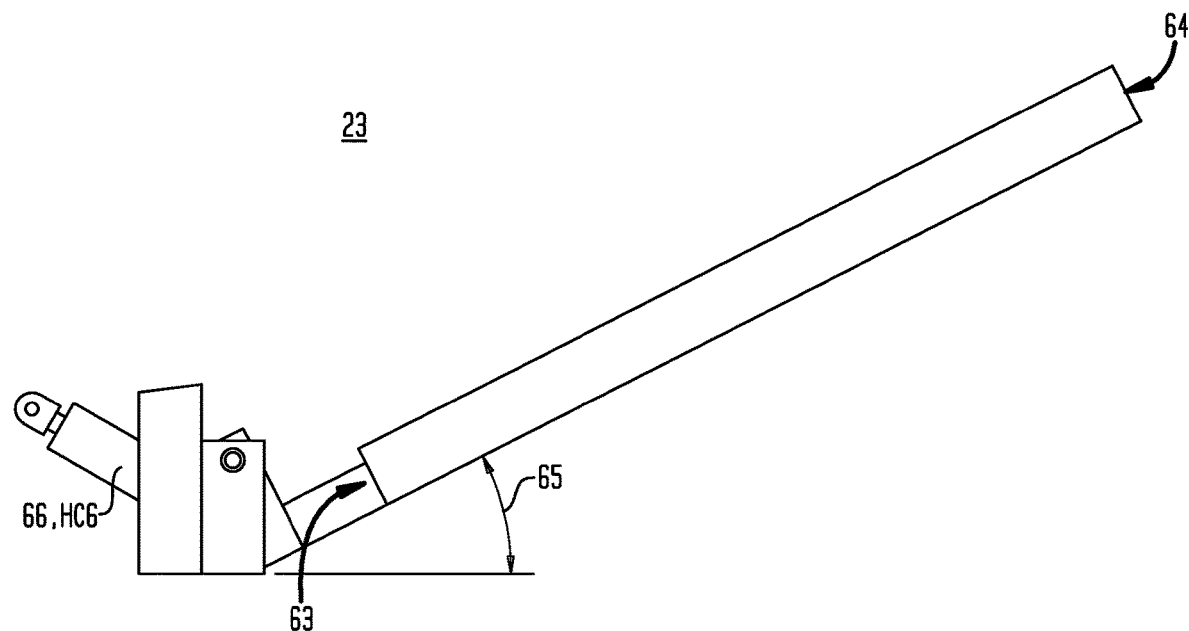
FIG. 23 is a second side elevation view of a particular embodiment of a bale transfer table.
Figure 24:
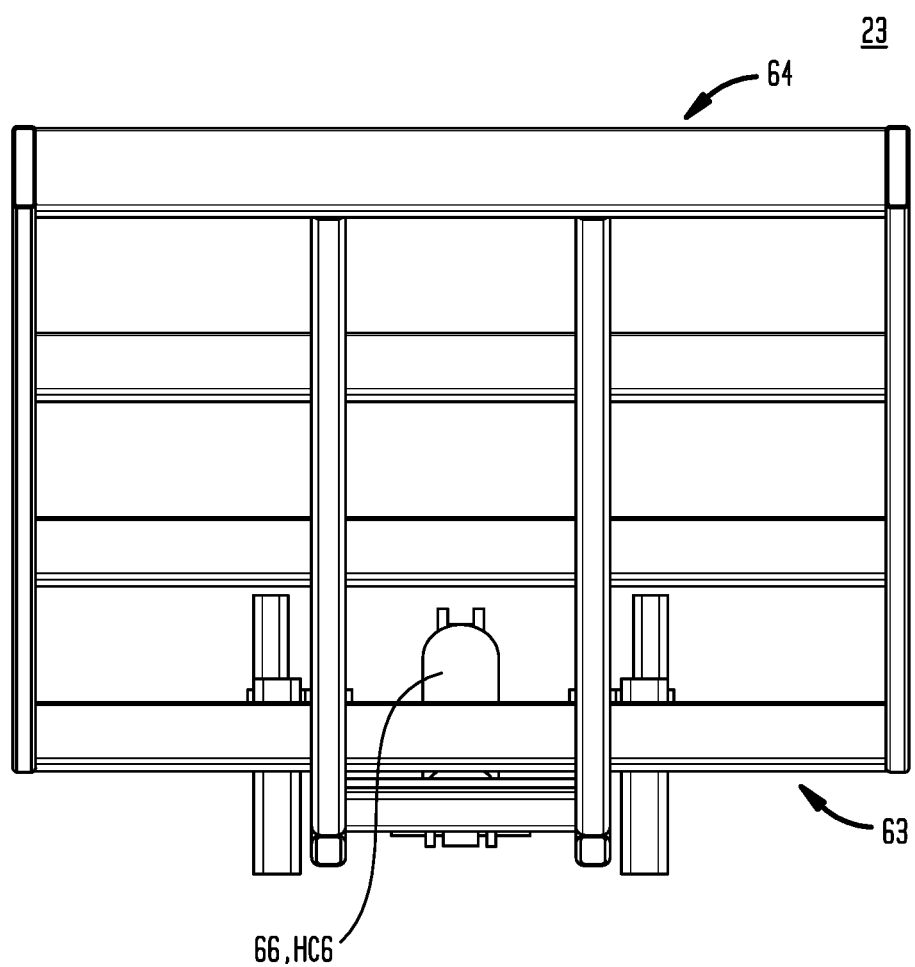
FIG. 24 is a front end elevation view of a particular embodiment of a bale transfer table.
Figure 25:
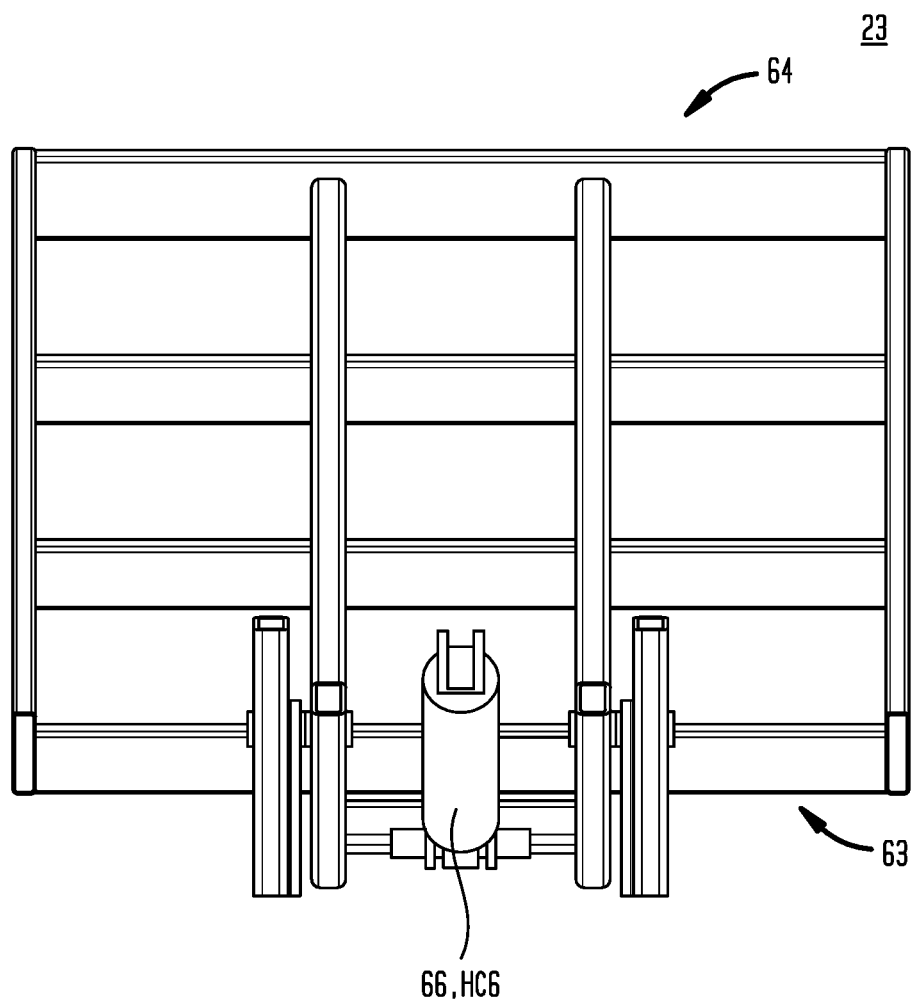
FIG. 25 is a rear end elevation view of a particular embodiment of a bale transfer table.
Figure 26:
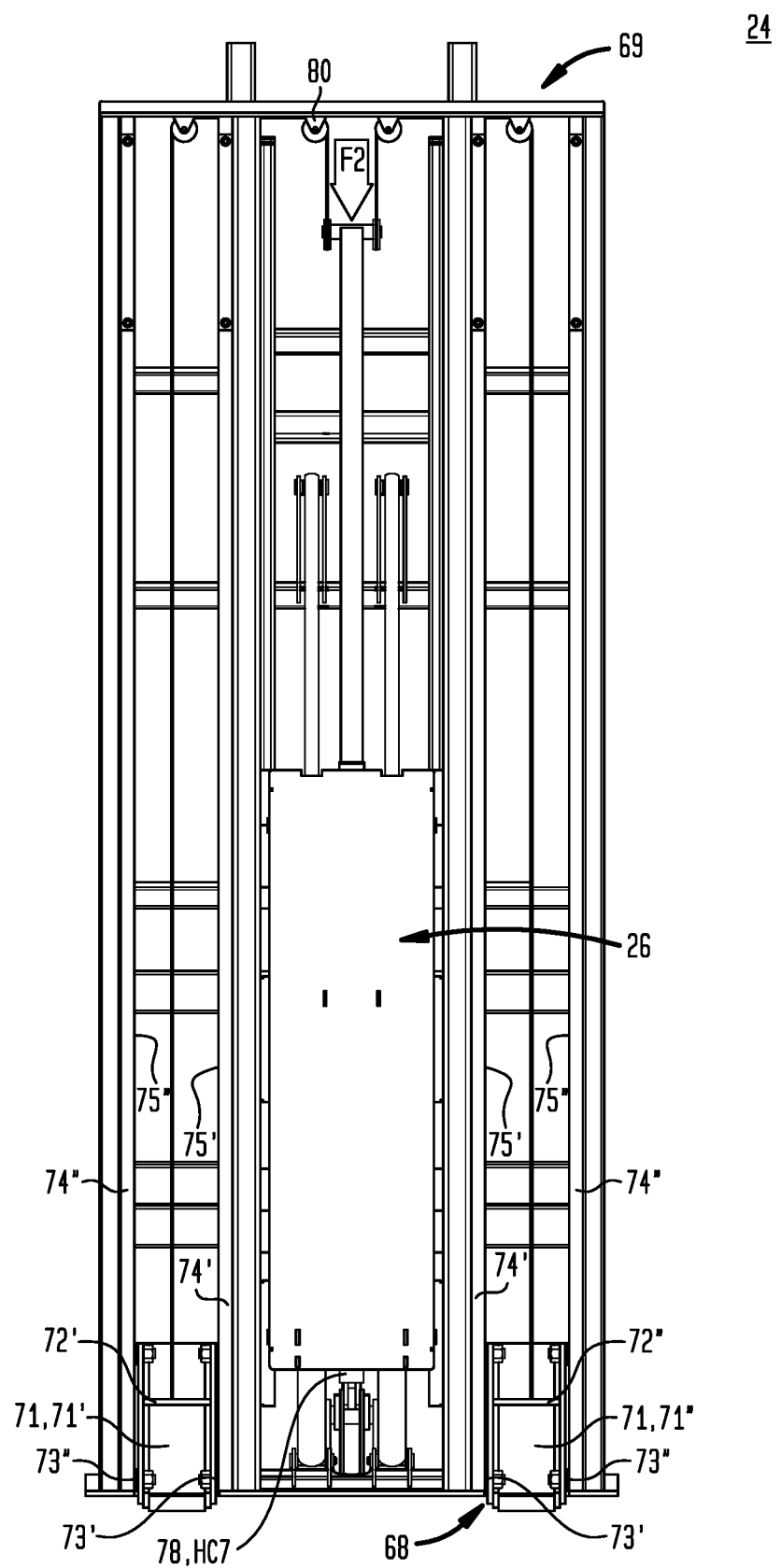
FIG. 26 is a top plan view of a particular embodiment of a bale stack bed.
Figure 27:
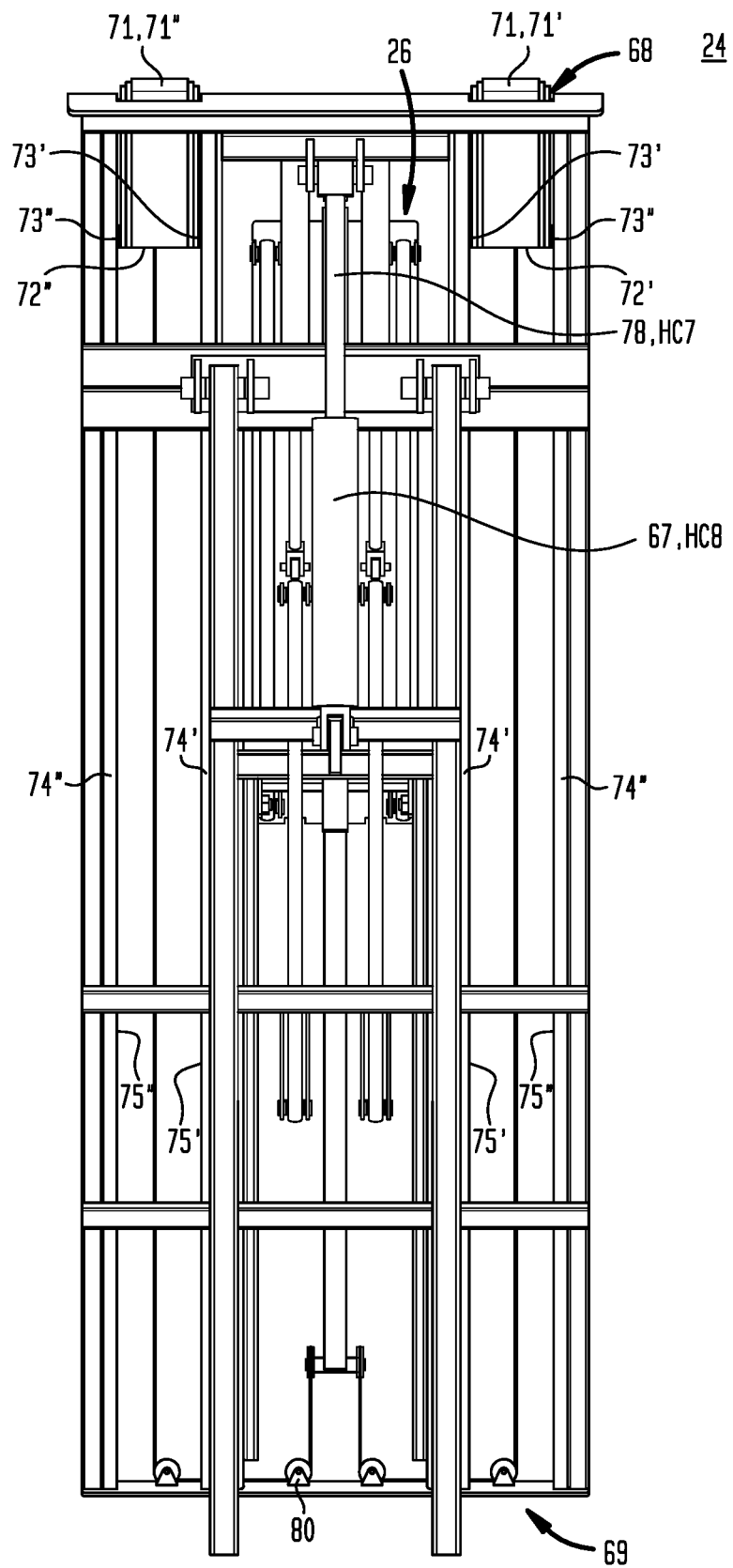
FIG. 27 is a bottom plan view of a particular embodiment of a bale stack bed.
Figure 28:
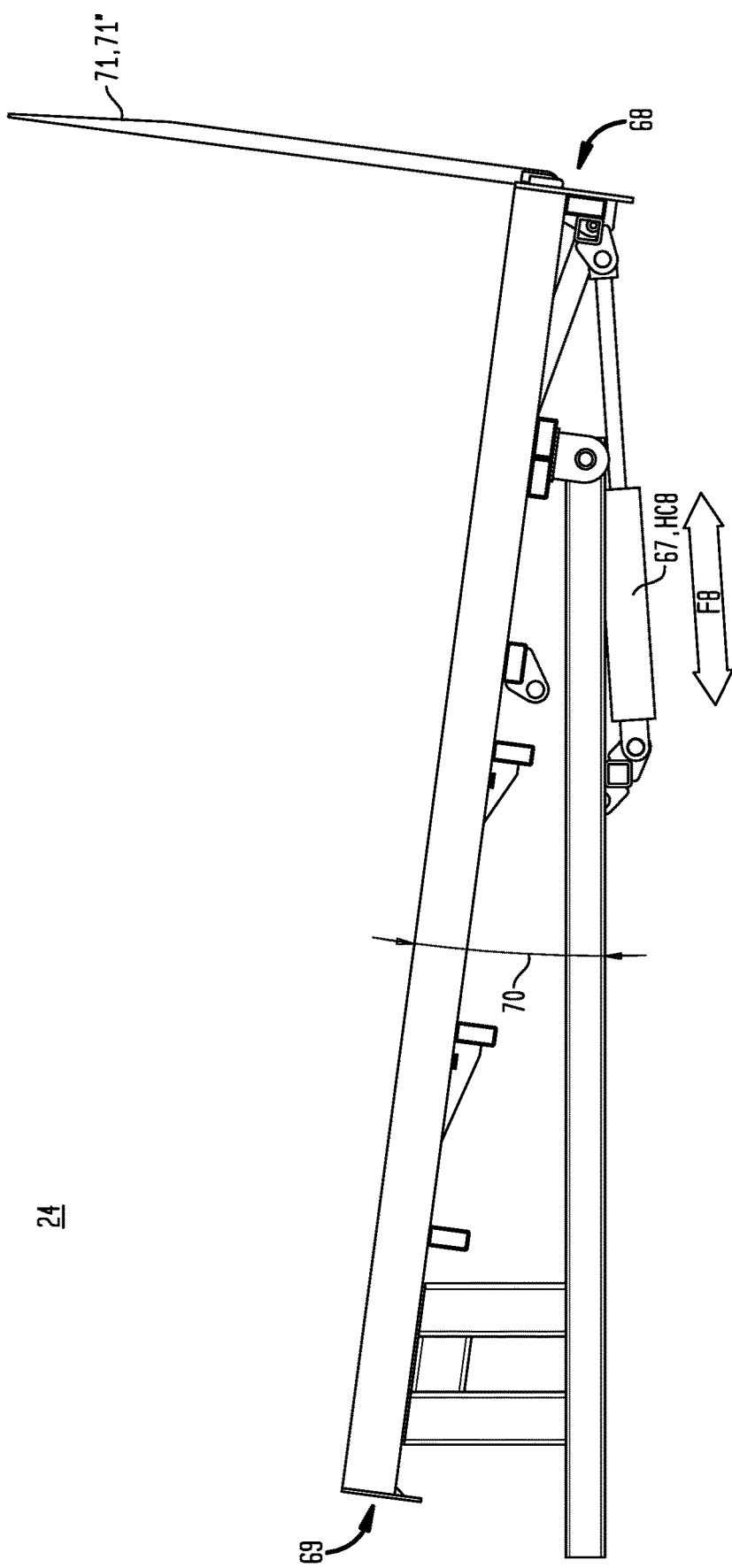
FIG. 28 is a first side elevation view of a particular embodiment of a bale stack bed.
Figure 29:
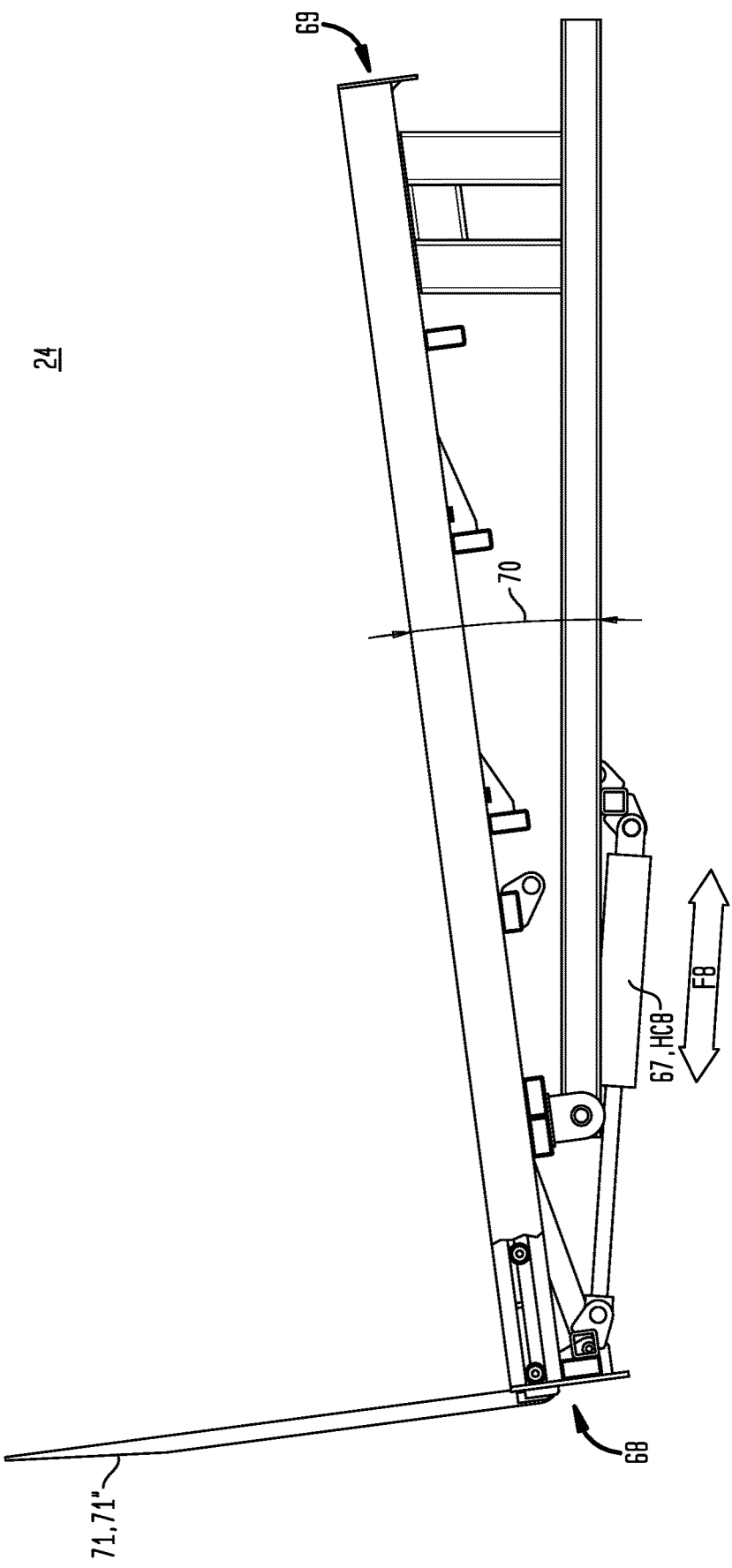
FIG. 29 is a first side elevation view of a particular embodiment of a bale stack bed.
Figure 30:
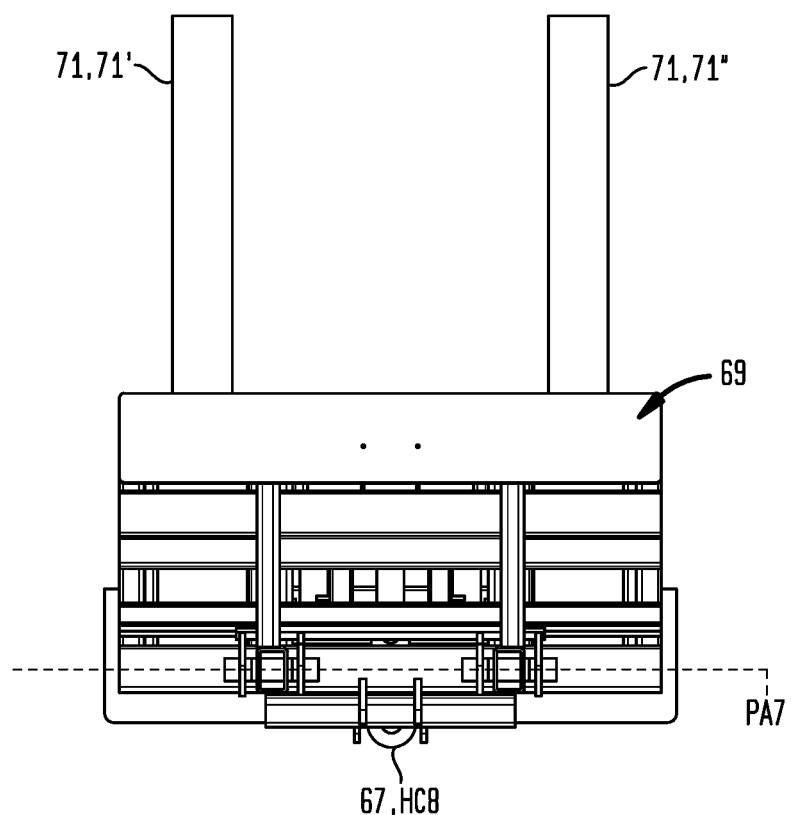
FIG. 30 is a front end elevation view of a particular embodiment of a bale stack bed.
Figure 31:
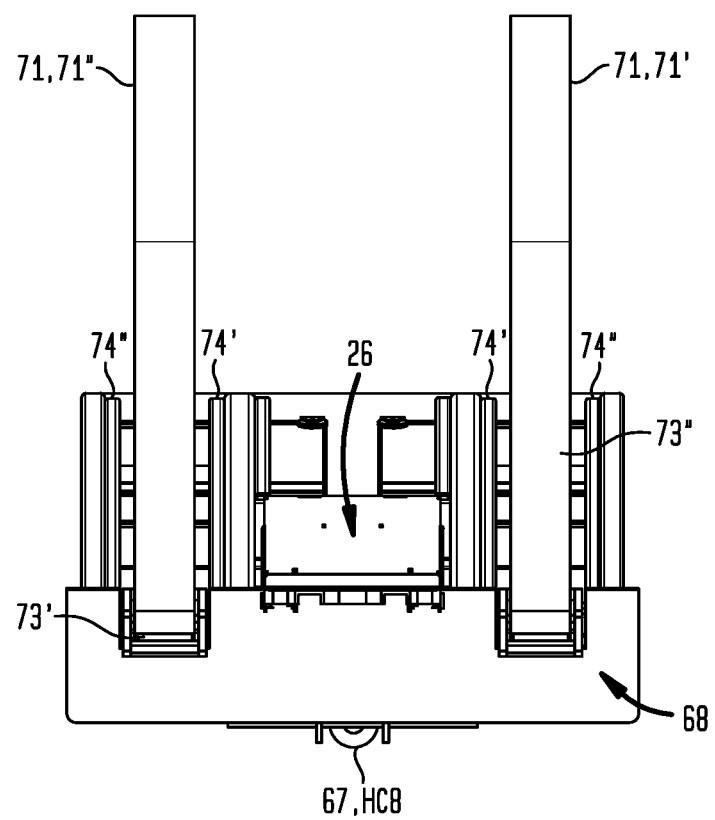
FIG. 31 is a rear end elevation view of a particular embodiment of a bale stack bed.
Figure 32:
FIG. 32 is a top plan view of a particular embodiment of a bale shuffler.
Figure 33:
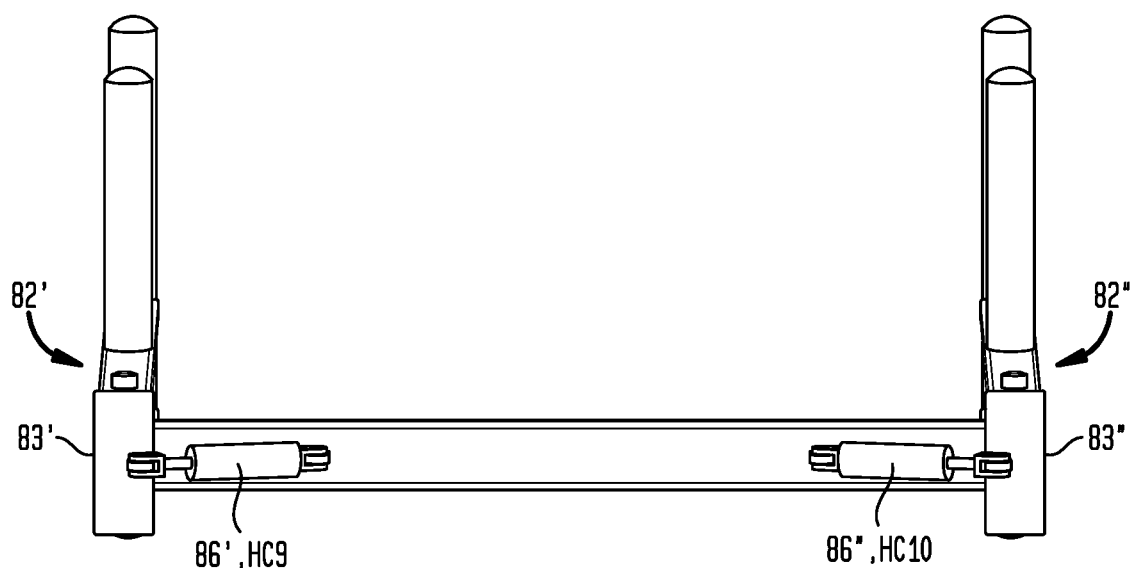
FIG. 33 is a bottom plan view of a particular embodiment of a bale shuffler.
Figure 34:
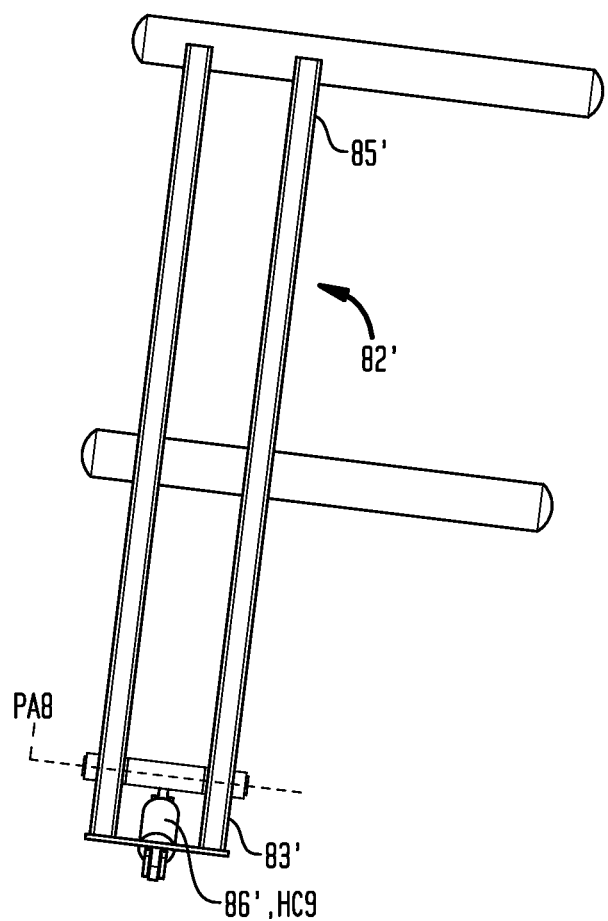
FIG. 34 is a first side elevation view of a particular embodiment of a bale shuffler.
Figure 35:
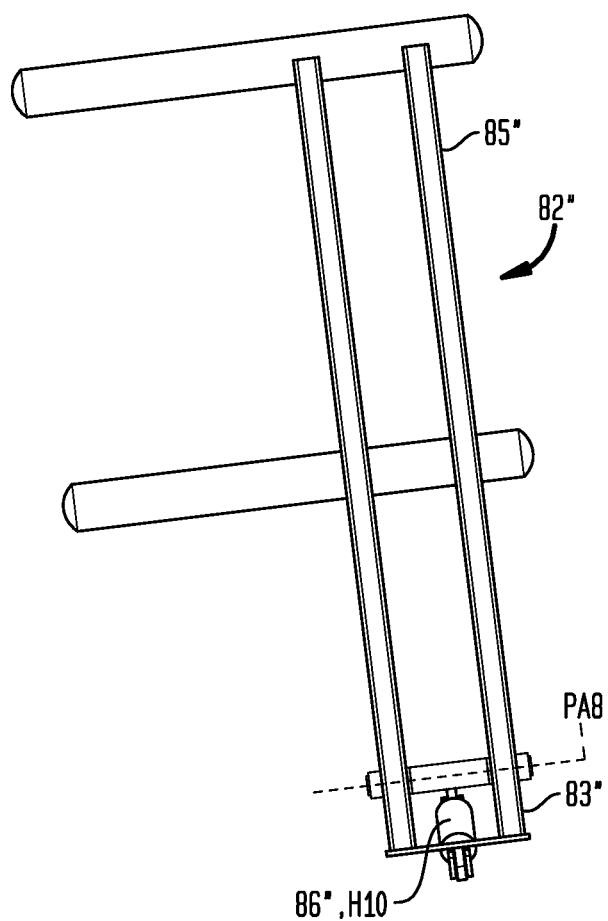
FIG. 35 is a second side elevation view of a particular embodiment of a bale shuffler.
Figure 36:
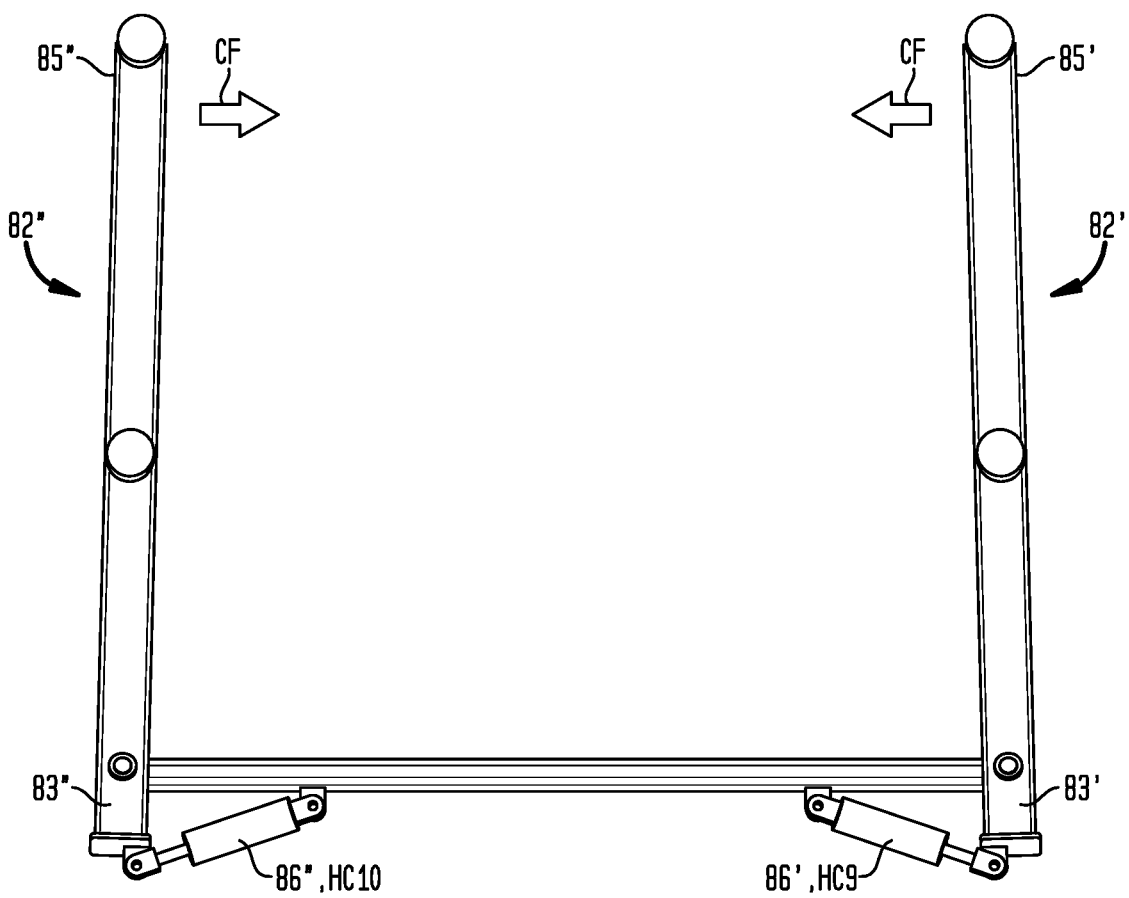
FIG. 36 is a front end elevation view of a particular embodiment of a bale shuffler.
Figure 37:
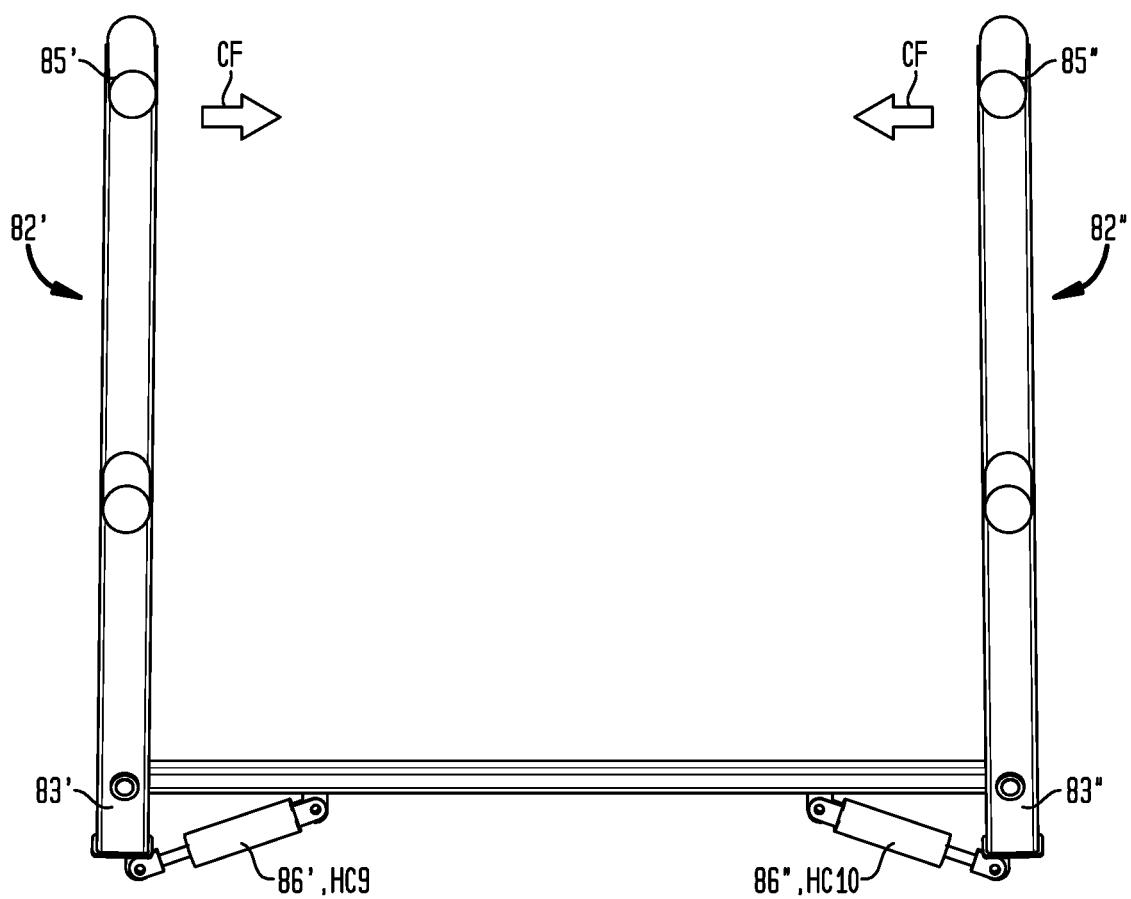
FIG. 37 is a rear end elevation view of a particular embodiment of a bale shuffler.

Again, with primary reference to FIGS. 8 through 13, the bale lift (21) can further include a bale gripper head (32) coupled to the pair of elongate lift arms (27) which operates to grip opposite bale end walls (33')(33") with sufficient compressive forces (F2) to allow the bale (2) to be lifted by operation of the pair of elongate arms (27) and the bale gripper head (32). In particular embodiments, the bale gripper head (32) can include a bale gripper crosspiece (34) rotatably coupled to lift arm second ends (29) of the pair of elongate lift arms (27). A bale gripper crosspiece lever (35) a can extend outward of the bale gripper crosspiece (34) toward the chassis front end (6). A bale gripper crosspiece actuator (36), which can be in the form off a hydraulic cylinder (HC2), can be interposed between the lift arm crosspiece (34) and the bale gripper crosspiece lever (35) to generate push or pull force (F3) to correspondingly rotate the bale gripper crosspiece (34) about pivot axis (PA2). The bale gripper head (32) can further include a pair of bale gripper arms (37')(37") each including one elongate bar (38) having a gripper arm first ends (39')(39") correspondingly pivotally coupled to opposite bale gripper crosspiece ends (40')(40") and outwardly extending from the bale gripper crosspiece ends (40')(40") to terminate in a gripper arm second ends (41')(41"). The one elongate bar (38) of each of the pair of bale gripper arms (37')(37") can, but need not necessarily be, generally rectangular in cross section (as shown in the example of FIG. 13); however, this is not intended to preclude embodiments of the one elongate bar (38) of each of the pair of bale gripper arms (37')(37") that may have a different configuration in cross section including one or more of any polygonal, quadrilateral, parallelogram or other cross sectional structure that confers the advantage of affording a one elongate bar (38) bale gripper arm (37')(37").

As shown in the illustrative examples of FIGS. 12 and 13, the opposite bale gripper crosspiece ends (40')(40") can each include a bifurcate mount (42')(42") each affording a pair of legs (43')(43") between which one elongate bar (38) of a corresponding gripper arm (37')(37") can be pivotally coupled, whereby the pair of bale gripper arms (37')(37") can be correspondingly rotated about pivot axis (PA3)(PA4) to increase or decrease distance between said gripper arm second ends (41')(41") to grip a bale (2) between the pair of gripper arms (37')(37"). In particular embodiments, each pivot axis (PA3)(PA4) can be disposed medially between gripper arm first and second ends (41')(41")(42')(42"), to provide a first gripper arm portion (44) and a second gripper arm portion (45) extending in opposite directions from each pivot axis (PA3)(PA4). Gripper arm actuators (46')(46"), hydraulic cylinders (HC3)(HC4), can be correspondingly interposed between each gripper arm first end (39')(39''') and the gripper arm crosspiece (34) to generate push or pull force (F4)(F5) to correspondingly rotate each of the pair of gripper arms (37')(37") about a corresponding pivot axis (PA3) (PA4) to increase or decrease distance between the gripper arm second ends (41')(41"). There can be an substantial advantage in a pair of gripper arms (37')(37") which each comprise one elongate bar (38) in that compressive force (F4)(F5) delivered by the pair of gripper arms (37')(37") configured as or consisting of only one elongate bar (38) provide substantially greater grip on the opposite bale end walls (33')(33") which can reduce or alleviate slippage of the bale (2) gripped by the pair of gripper arms (37")(37"). In particular embodiments, bale gripper arms (37') (37") including only one bar (38) can further include a gripper arm end piece (47') (47") joined to the gripper arm second end (41') (41"). The gripper arm end pieces (47')(47") can correspondingly extend inward from each of the pair of gripper arms (37')(37"), extending toward one another, to enhance compressive forces (F4)(F5) proximate the gripper arm second ends (41')(41"). In particular embodiments, the gripper arm second ends (41') (41") can medially join a cylindrical gripper arm end piece (47') (47") (as shown in the example of FIG. 11).

Figure 47:
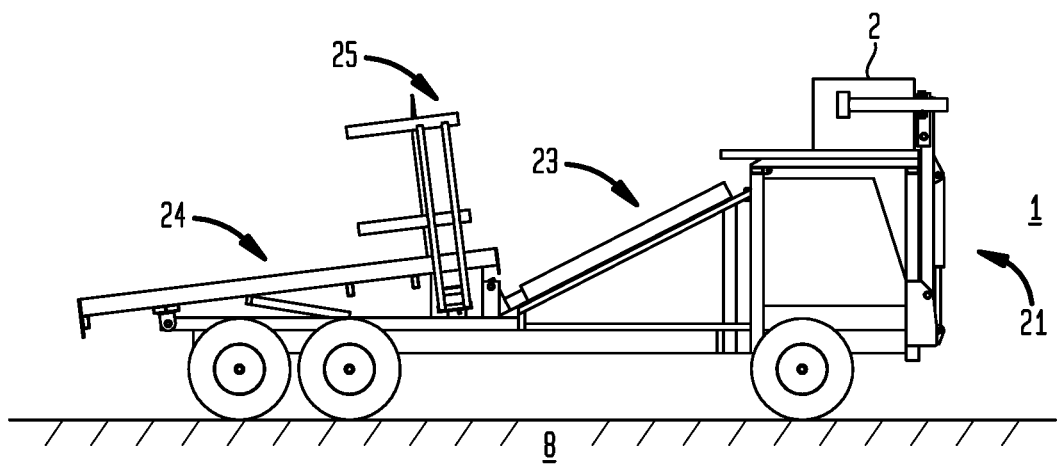
FIG. 47 is a first side elevation view illustrating a method of rotating a particular embodiment of a bale gripper to a position a bale on a bale receiving platform.

Bale Receiving Platform. Now, with primary reference to FIGS. 14 through 19, particular embodiments of the bale stacker (1) can, but need not necessarily, include a bale receiving platform (22) disposed over the bale stacker chassis (5). The bale receiving platform (22) can be located to receive bales (2) released from the bale gripper head (32) (as shown in the example of FIGS. 45 through 51). The bale gripper head (32) having gripped a bale (2) between the pair of bale gripper arms (37')(37")(as shown in the example of FIG. 44) can be rotated about pivot axis (PA2) to lift the bale from a surface (8) (as shown in the example of FIG. 45). The pair of elongate lift arms (27')(27") can then be rotated about pivot axis (PA1) to a primarily vertical orientation to dispose the bale (2) over the bale receiving platform (22) (as shown in the example of FIG. 46). The bale gripper head (32) can be further rotated about pivot axis (PA2) to engage a bale sidewall (49) with the bale receiving platform (22) (as shown in the example of FIG. 47). The pair of bale gripper arms (37')(37") can then be rotated about pivot axis (PA3)

Figure 48:
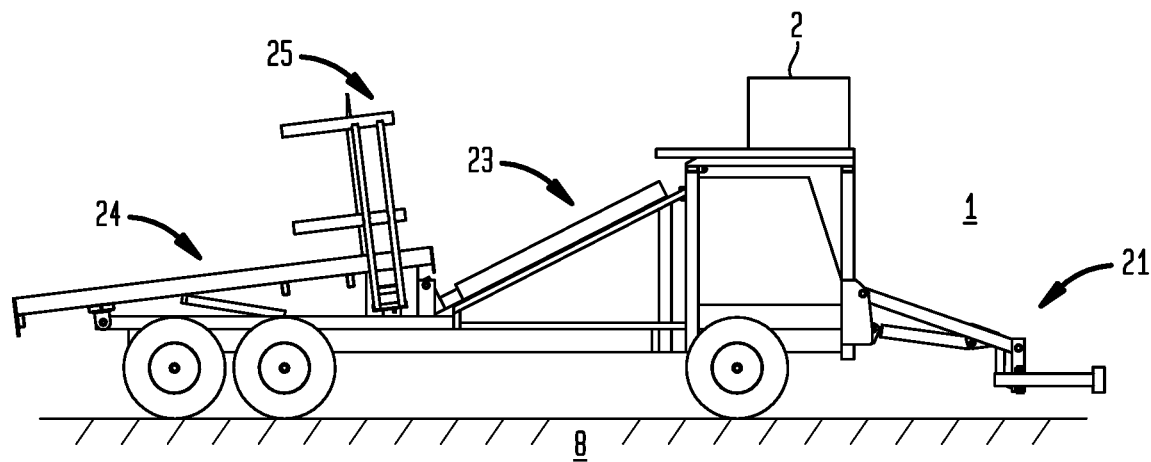
FIG. 48 is a first side elevation view illustrating a method in which a bale has been positioned on a bale receiving platform.

(PA4) to increase distance between the gripper arm second ends (41')(41") to release the bale (2) from the bale gripper head (32) to dispose the bale (2) on the bale receiving platform (22) (as shown in the example of FIG. 48).

Figure 49:
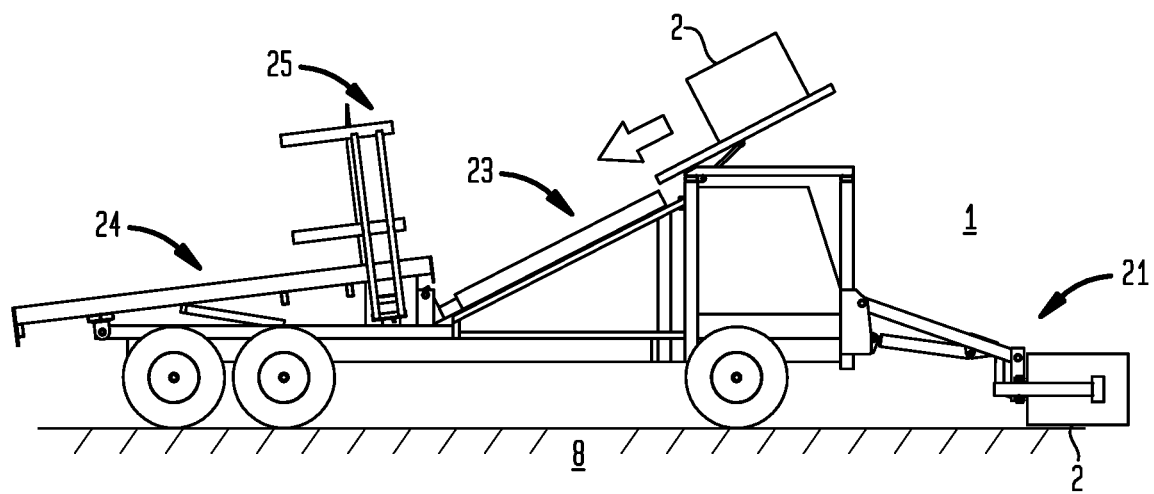
FIG. 49 is a first side elevation view illustrating a method in which a particular embodiment of a bale receiving platform inclines to allow a first bale to slide from the bale receiving platform to a bale transfer table.

Again, with primary reference to FIGS. 14 through 19, the bale receiving platform (22) can include a generally flat bale receiving top surface (50) opposite a bale receiving platform bottom surface (51) joined by bale receiving platform sides (52). The bale receiving platform (22) can, but need not necessarily, be a rectangular framework (53) including two pairs of opposite platform side members (54')(54")(55')(55") and a sufficient number of spaced apart cross members (56) to provide the generally flat bale receiving top surface (50) to support the bales (2); however, this is not intended to preclude embodiments which define a different configuration of the bale receiving platform side members (54), useful in receiving a bale (2). The bale receiving platform (22) can supported above and in primarily horizontal relation to the bale stacker chassis (5) on a front support member(s) (57) and a rear platform support member(s) (58). The bale receiving platform (22) can be pivotally coupled by a bale receiving platform rear end (59) to the rear support members (58) and rest upon the front support members (57). The bale receiving platform (22) can rotate about the rear support member(s) (58) on pivot axis (PA5). A bale receiving platform actuator(s)(a (60), hydraulic cylinder (HC5), can be interposed between the rear support member (58) and the bale receiving platform bottom surface (51) of the bale receiving platform (22) to generate push pull forces (F6) to lift the bale receiving platform (22) from the front support member (57) in angled relation to the bale stacker chassis (52) to allow a bale (2) to slidingly disengage the generally flat bale receiving surface (50)(as shown in the example of FIGS. 49 and 50). A substantial problem with conventional bale receiving platforms (50) can be that bales (2) do not slidably disengage because the frictional forces (FF) are not overcome by angled orientation of the bale receiving surface (50) which in conventional platforms has an angle of inclination limited to about 15 degrees to about 20 degrees. It has been discovered that the problem can reside in the moisture content of the bale (2), or the type of forage baled, or the ambient environmental conditions, or combinations thereof, which causes a substantial increase in frictional forces (FF) between the bale (2) and the generally flat bale receiving top surface (50). This problem has been resolved in embodiments of the inventive bale receiving platform (22) by, first, reducing the bale receiving surface area (61) to the fewest number of spaced apart crossmembers (56) based upon the H×L×W of the bales (2), and reducing the dimensional relations of each crossmember (56) engaging the bale (2) to reduce frictional forces (FF), or second, increasing the angle that can be achieved in the bale receiving top surface (50) from the conventional 15 degrees to 20 degrees to an incrementally adjustable angle of up to about 50 degrees, or combinations thereof, to afford reliable sliding disengagement of the bale (2) over the bale receiving top surface (50) of the bale receiving platform (22) regardless of the forage baled, the moisture content (and even if the bale (2) is wet), the ambient environmental conditions, and combinations thereof.

Figure 52:
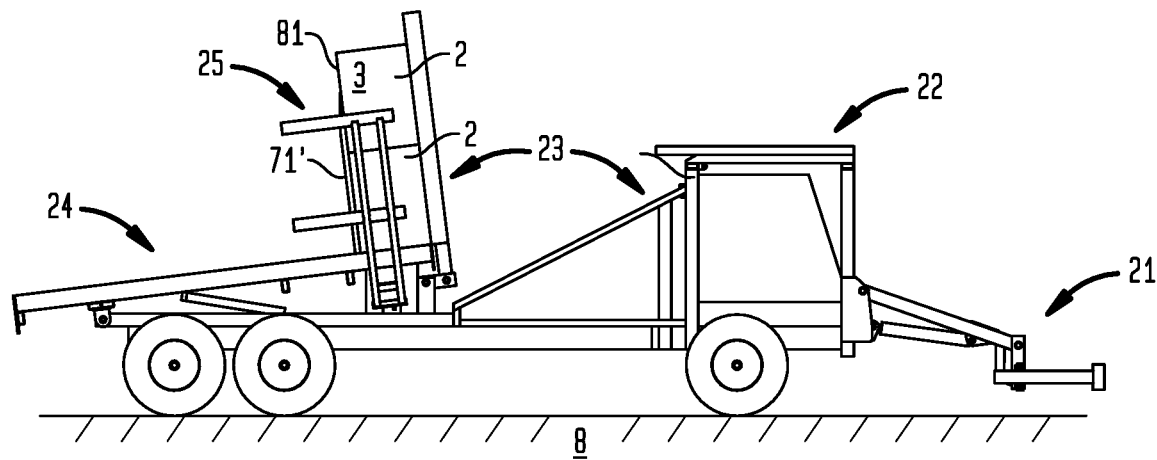
FIG. 52 is first side elevation view illustrating a method in which a particular embodiment of a bale transfer table rotates to a primarily vertical orientation to transfer a bale stack from a particular embodiment of a bale transfer table to a particular embodiment of bale stack bed.
Figure 53:
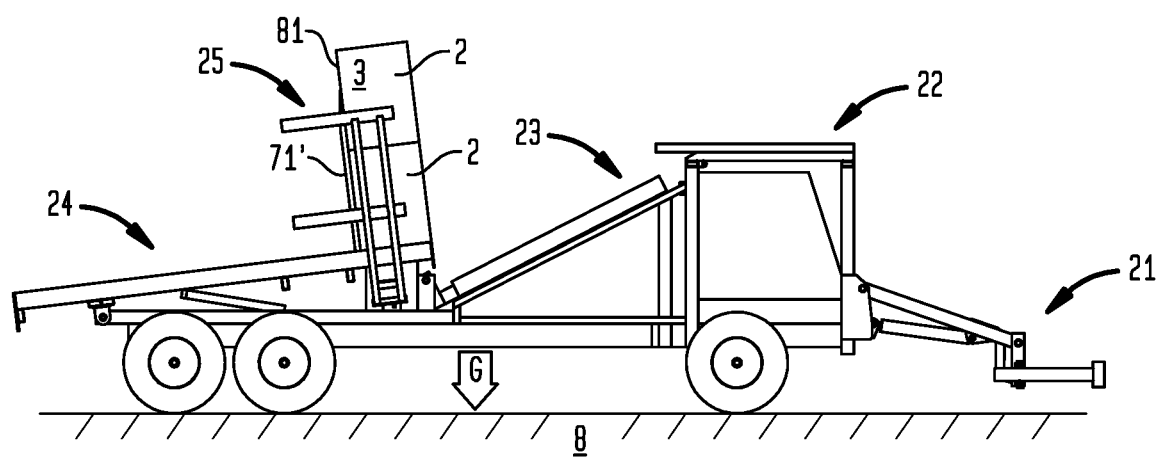
FIG. 53 is first side elevation view illustrating a method in which a particular embodiment of a bale transfer table rotates from a primarily vertical orientation an inclined orientation to dispose a first bale stack on a particular embodiment of a bale stack bed.

Bale Transfer Table. Now, with primary reference to FIGS. 20 through 25, particular embodiments of the bale stacker (1) can, but need not necessarily, include a bale transfer table (23) which disposes bales (2) sliding off from the bale receiving platform (22) into a bale stack (3). The bale transfer table (23) can have a bale transfer table first end (63) pivotally coupled to the bale stacker chassis (5) to allow the bale transfer table (23) to rotate about pivot axis (PA6). The bale transfer table (23) can extend in an angled relation to the bale stacker chassis (5) to dispose a bale transfer table second end (64) proximate the bale receiving platform rear end (59). The bale transfer table (23) can be disposed at a bale transfer table first angle (65) of about 30 degrees to about 40 degrees in relation to the bale stacker chassis (5) to receive bales (2) which slide off from the bale receiving platform (22)(as shown in the example of FIGS. 50 and 51). Under influence of gravity (G) a first bale (2') can slide toward the bale transfer table first end (63) (as shown in the example of FIG. 51). Similarly, a second or more bales (2") can slide under influence of gravity (G) toward the bale receiving table first end (63) to dispose bale sidewalls (49) in abutted engagement to generate a bale stack (3) of two or more bales (2) on the bale transfer table (23) (as shown in the example of FIG. 52). By operation of a bale transfer table actuator (66), hydraulic cylinder (HC6), to generate push or pull forces (F7), the bale transfer table (23) can be rotated about pivot axis (PA6) to establish the bale stack (3) in primarily vertical relation to the bale stacker chassis (5) (as shown in the example of FIG. 53).

Figure 57:
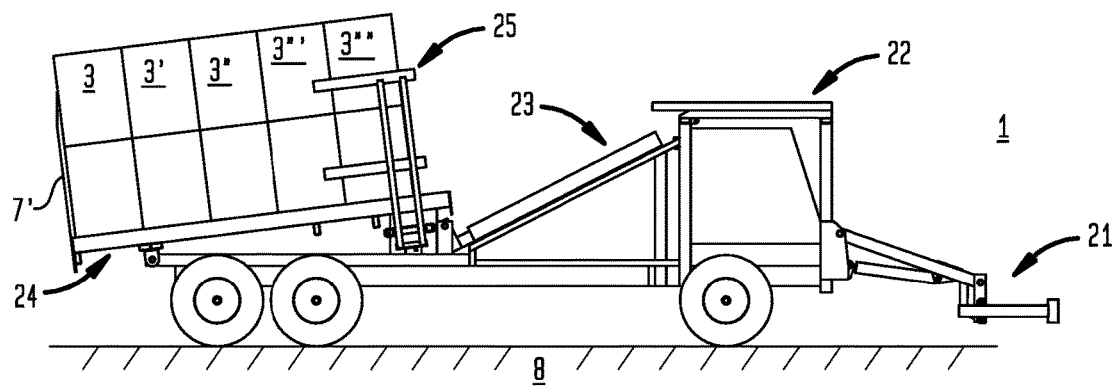
FIG. 57 is a first side elevation view of a bale stacker having a five bale stacks disposed on an embodiment of the bale stack bed.
Figure 58:
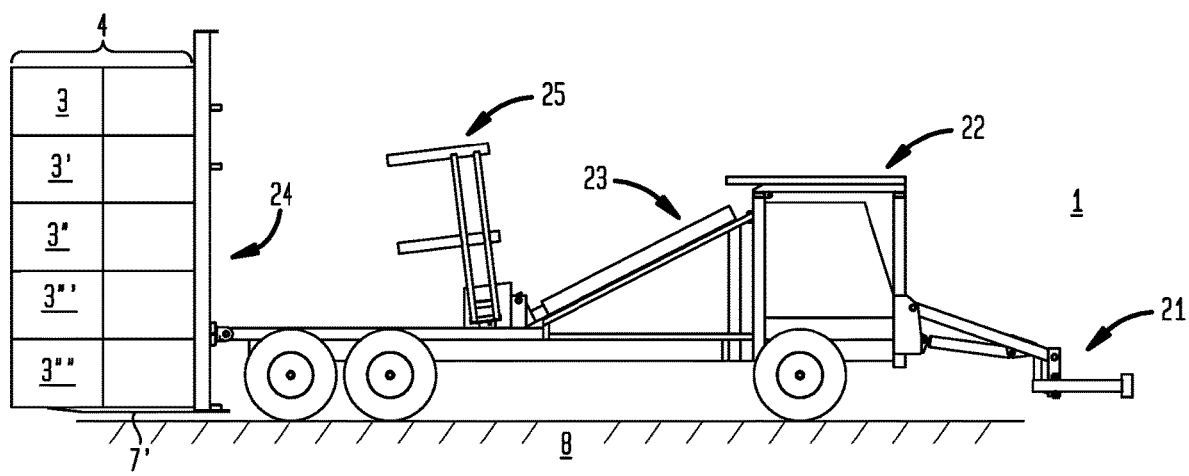
FIG. 58 is first side elevation view illustrating a method in which a particular embodiment of a bale stack bed rotates from an inclined orientation to a primarily vertical orientation to dispose a plurality of bales stacks in a bale bundle proximate a support surface.

Bale Stack Bed. Now, with primary reference to FIGS. 26 through 31, particular embodiments of the bale stacker (1) can, but need not necessarily, include a bale stack bed (24) including a bale stack bed first end (68) opposite a bale stack bed second end (69). The bale stack bed (24) can be pivotally mounted proximate the bale stack bed first end (68) to the bale stacker chassis (5) to allow rotation of said bale stack bed about pivot axis (PA7). The bed stack bed (24) can be disposed at a bale stack bed first angle (70) of about 15 degrees to about 25 degrees to the bale stacker chassis (5) with the bale stack bed second end (69) disposed adjacent and above the bale transfer table first end (63). The bale stack bed first angle (70), or the structural relationship between the bed stack bed (24) and the bale transfer table (23), and combinations thereof, confer substantial advantages over conventional bed stack beds (24) disposed horizontal to the bale stacker chassis (5) or distal from the a bed transfer table (23). In the first instance, as shown in the example of FIG. 51, the bale stack bed second end (69) disposed in angled relation to the bale transfer table first end (63)(the illustrative example of FIG. 51 depicting a bale stack bed first angle of about 15 degrees to about 25 degrees) can engage a first bale sidewall (49') of a first bale (2') in a bale stack (3) on the bale transfer table (23). This engagement with the first bale sidewall (49') of a first bale (2) acts as fulcrum or pivot point (PP) on which the bale stack (3) can pivot as the bale transfer table (23) rotates about pivot axis (PA6) to dispose the bale stack (3) in primarily vertical relation to the bale stack bed (24) (as shown in the example of FIG. 52). Accordingly, as the bale transfer table (23) rotates to abut the bale stack bed second end (69) in primarily vertical relation to the bale stacker chassis (5), a first bale stack (3') can be disposed on the bale stack bed (24) (as shown in the example of FIG. 53). In the second instance, the bale stack bed first angle (70) allows the influence of gravity (G) to assist in moving the first bale stack (3') toward the bale stack bed first end (68) as a second bale stack (3")(or a third or more bale stacks (3)) transfers from the bale transfer table (23) to the bale stack bed (24)(as shown in the examples of FIGS. 57 through 58).

Again, with primary reference to FIGS. 26 through 31, the bale stack bed (24) can further include at least one fork (71) disposed in primarily vertical relation to the bale stack bed (24) and movable between the bale stack bed first end (68) and the bale stack bed second end (69). In the illustrative example of FIG. 30, the bed stack bed (24) includes a pair of forks (71') (71") correspondingly upwardly extending from a pair of fork carriages (72')(72") each having opposite carriage sides (73')(73") movably correspondingly engaged to a pair of carriage guides (74')(74") extending between the bale stack bed first end (68) and the bale stack bed second end (69) whereby movement of the pair of fork carriages (72')(72") corresponding move the pair of forks (71')(71") toward the bale stack bed second end (69). In the illustrative example, each of the pair of carriage guides (74')(74") comprises a pair of guide channels (75')(75") having open channel sides (76')(76") disposed in opposed spaced apart relation to correspondingly receive opposite carriage sides (73')(73") each including a plurality of rollers (77) which correspondingly roll within the pair of guide channels (75') (75"). A carriage actuator (78), including a hydraulic cylinder (HC7) disposed medially between the pair of carriage guides (74')(74"), operates to generate pulling force (F7) on a pair of cables (79) corresponding connected through a pully assembly (80) to the pair of fork carriages (72')(72") to move the pair of fork carriages (72')(72") toward the bale stack bed second end (69). The pair of forks (71') (71") can be positioned to engage the bale stack side (81) as a first bale stack (3') transfers from the bale transfer table (23) to the bale stack bed (24). The at least one fork (71')(71") can be moved toward the bale stack bed first end (68) by influence of gravity (G) on the first bale stack (3') having abutted engagement to the pair of forks (71')(71") to provide space proximate the bale stack bed second end (69) to receive a second bale stack (3"). Receipt of the second bale stack (3") on the bale stack bed (24), as above described, can further urge the first bale stack (3") abutted against the pair of forks (71')(71") toward bale stack bed first end (68). The carriage actuator (78), can be further operated or sufficiently resist movement of the pair of forks (71')(71") toward the bale stack bed first end (68) to compress the first bale stack (3') and the second bale stack (3") and subsequent bale stacks against the bale transfer table (23) to further assure abutted engagement of bale stack sides (81) on the bale stack bed (24) (as shown in the example of FIG. 51).

Figure 56:
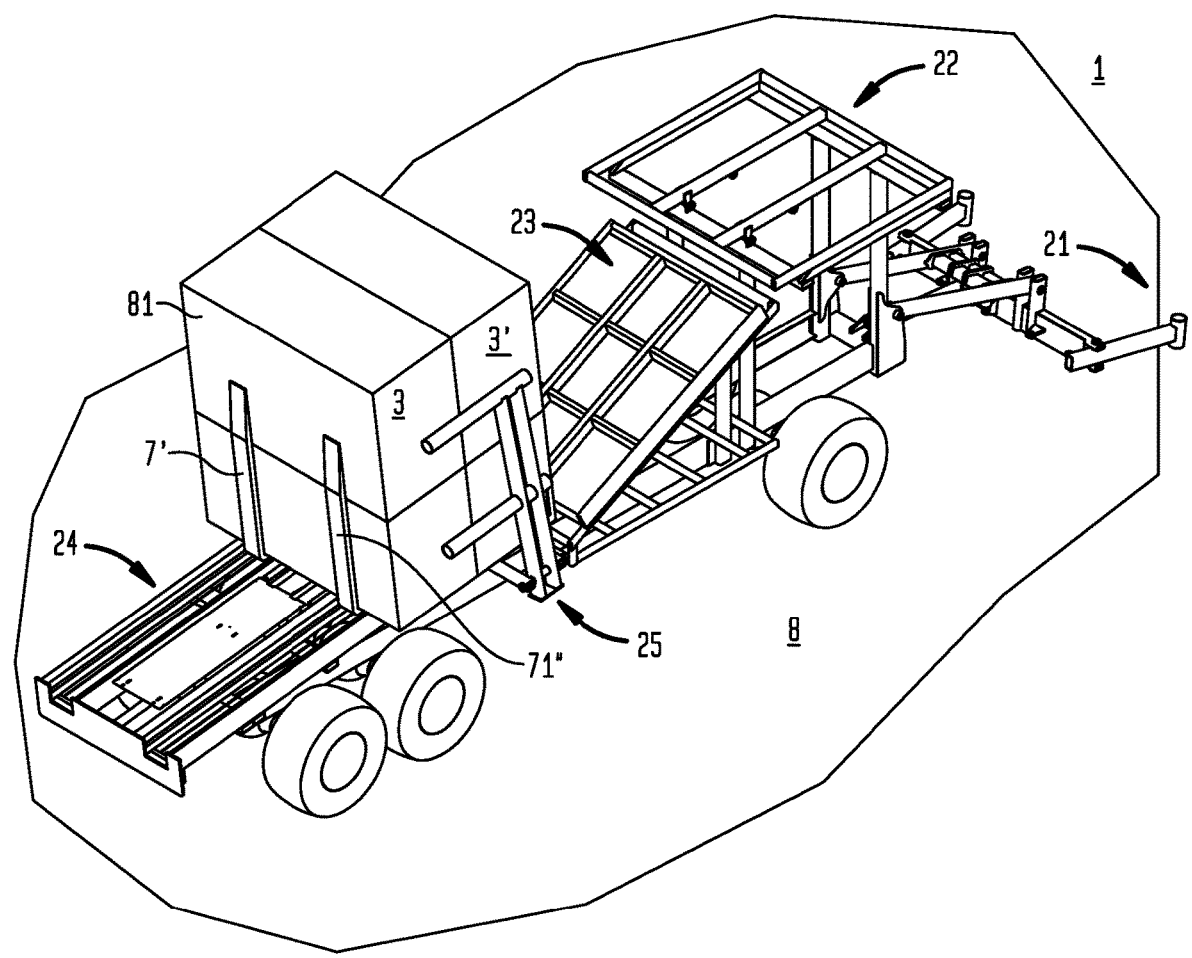
FIG. 56 is a rear end perspective view of a bale stacker having a two bale stacks disposed on an embodiment of the bale stack bed.

Bale Shuffler. Now, with primary reference to FIGS. 32 through 37, particular embodiments of the bale stacker (1) can, but need not necessarily, include a bale shuffler (25) including a pair of bale shuffler arms (82') (82") each pivotally coupled by bale shuffler arm first ends (83') (83") to opposite bale stacker chassis sides (84')(84") of the bale stacker chassis (5). The pair of bale shuffler arms (82') (82") each upwardly extend to a primarily vertical orientation relative to the opposite bale stack bed sides (84') (84") proximate said bale stack bed second end (69) to terminate in bale shuffler arm second ends (85') (85"). Each of the pair of bale shuffler arms (82') (82") can correspondingly rotate about a pivot axis (PA8) (PA9) by operation of corresponding pair of bale shuffler arm actuators (86')(86"), including hydraulic cylinders (HC9)(HC10) interposed between a corresponding bale stacker chassis side (84')(84") and a corresponding one of the bale shuffler arm first ends (83')(83"), to decrease distance between the bale shuffler arm second ends (85')(85"). The pair of bale shuffler arms (82') (82") can be operated to engage opposite bale stack end walls (87') (87") of a first bale stack (3'), and each subsequent bale stack (3", 3''' . . . ), to align misaligned opposite bale stack ends (87') (87") in the first bale stack (3') or subsequent bale stacks (3", 3''' . . . ) on the bale stack bed (24) (as shown in the example of FIGS. 56 through 57). Embodiments of the bale shuffler (25) having bale shuffler arms (82') (82") that pivot about corresponding pivot axis (PA8)(PA9) by operation of hydraulic cylinders (HC9)(HC10) apply substantially greater compression force (CF) to opposite bale stack end walls (87') (87") as compared to conventional devices to align bales (2) within a bale stack (3).

Figure 54:
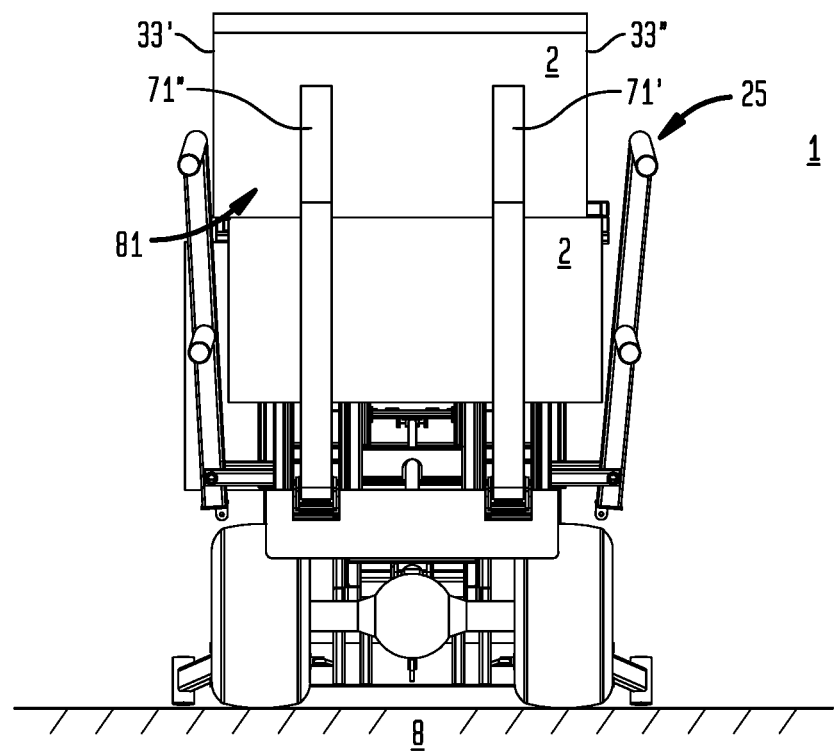
FIG. 54 is rear end elevation view illustrating a first bale stack disposed on a particular embodiment of a bale stack bed between a particular embodiment of a bale shuffler with bale ends misaligned.
Figure 55:
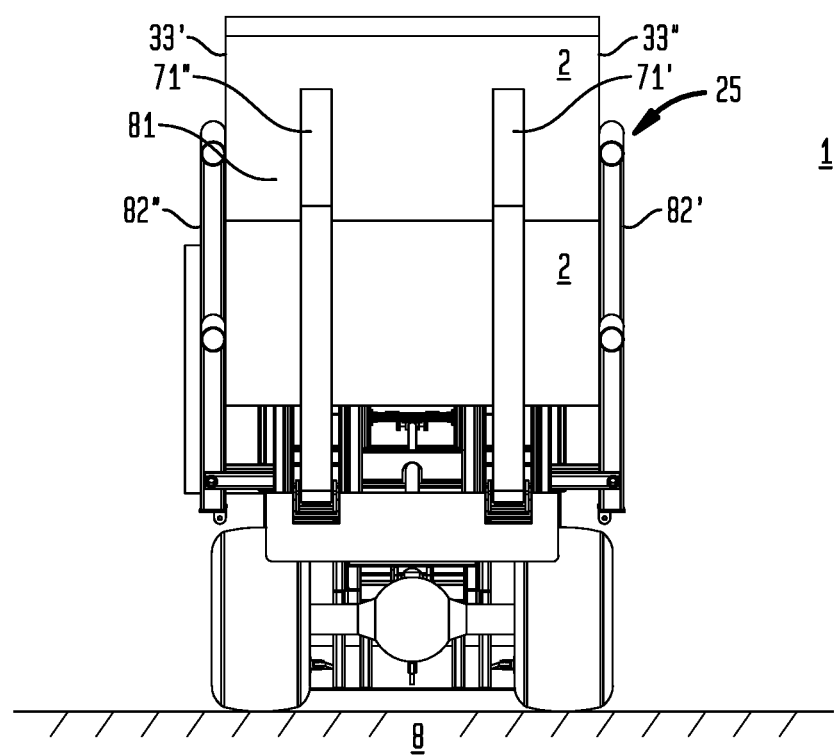
FIG. 55 is rear end elevation view illustrating a method in which a particular embodiment of a bale shuffler engaging opposite bale stack sides to move bale ends of a first bale stack into alignment.

Particular embodiments of the bale shuffler arms (82') (82") can include at least one bale shuffler upright members (88') (88") extending in primarily vertical orientation to the bale stacker chassis (5) and having at least one bale shuffler compressor member (89') (89"') disposed to engage opposite bale end walls (33') (33") or each bale (2) in a bale stack (3). The at least one bale shuffler compressor member (89') (89"') can extend in angled or generally orthogonal relation to the bale shuffler upright member (88') (88") which by operation of the pair of bale shuffler actuators (86') (86") engages each bale shuffler compressor member (89') (89"') with a corresponding one of the opposite bale end walls (33') (33") in a bale stack (3) to align opposite bale end walls (87') (87") in a bale stack (3) (as shown in the examples of FIGS. 54 and 55). In particular embodiments as shown in the illustrative examples, the bale shuffler upright members (88')(88") and the bale shuffler compressor members (89') (89"') can comprise cylindrical members (90') (90") affording arcuate external surfaces (91') (91") over which the engaged opposite bale end walls (33') (33") can more readily slide to be aligned in the corresponding bale stack (3).

Bale Stack Push Off. Again, with primary reference to FIGS. 26 through 31, in particular embodiments, the bale stack bed (24) pivotally mounted proximate the bale stack bed first end (68) to the bale stacker chassis (5) can rotate about pivot axis (PA7) by operation of hydraulic actuator (67) which can comprise hydraulic cylinder (HC8) to generate push or pull forces (F8) to dispose the bale stack bed (24) in primarily vertical orientation to the bale stacker chassis rear end (7) (as shown in the example of FIG. 60). The at least one fork or pair of forks (71') (71") moved proximate the bale stack bed first end (68) can engage or nearly engage the surface (8) supporting the bale stacker (1). Correspondingly, the bale stacks (3') (3" . . . ) disposed on the bale stack bed (24) and having the first bale stack (3") engaged with the pair of forks (71')(71") can be correspondingly rotated to dispose the first bale stack side wall (49') proximate the surface (8) supporting the bale stacker (1) (as shown in the example of FIG. 58).

Figure 38:
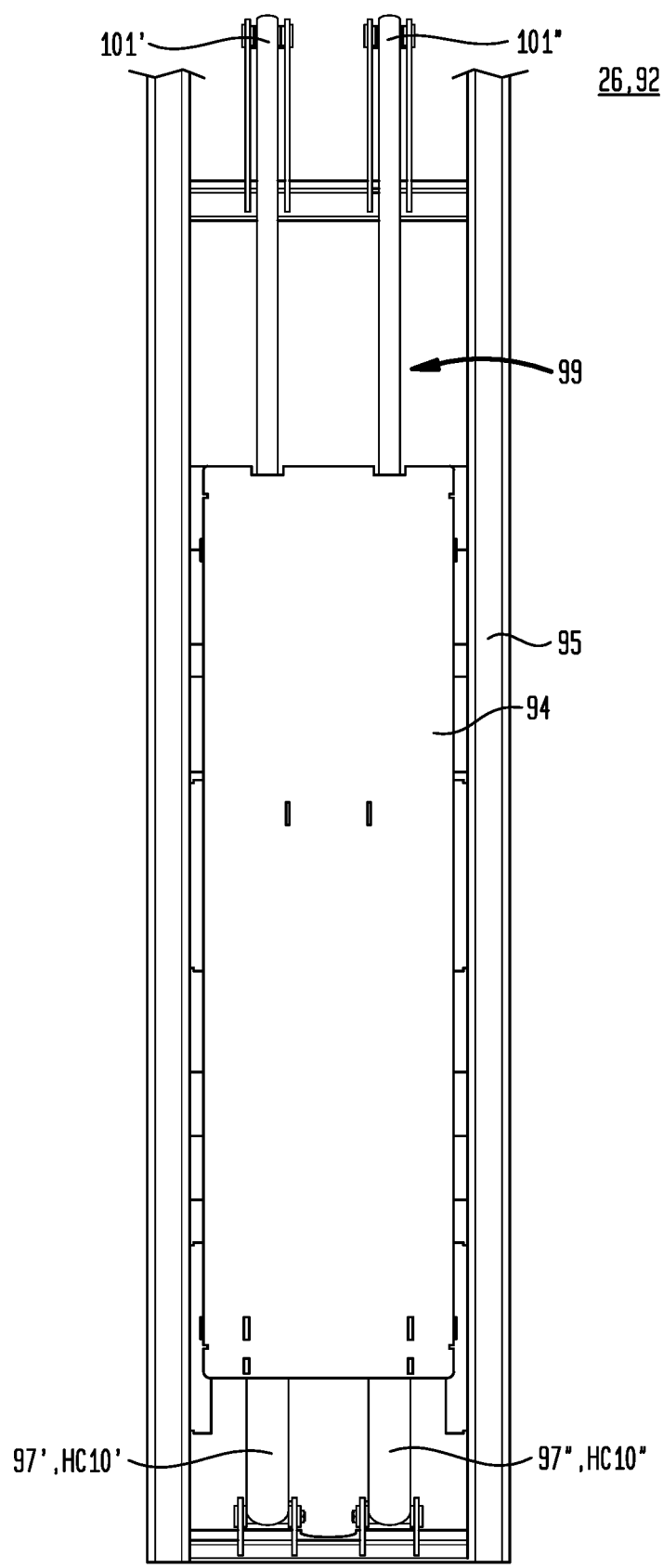
FIG. 38 is a top plan view of a particular embodiment of a bale push off.
Figure 39:
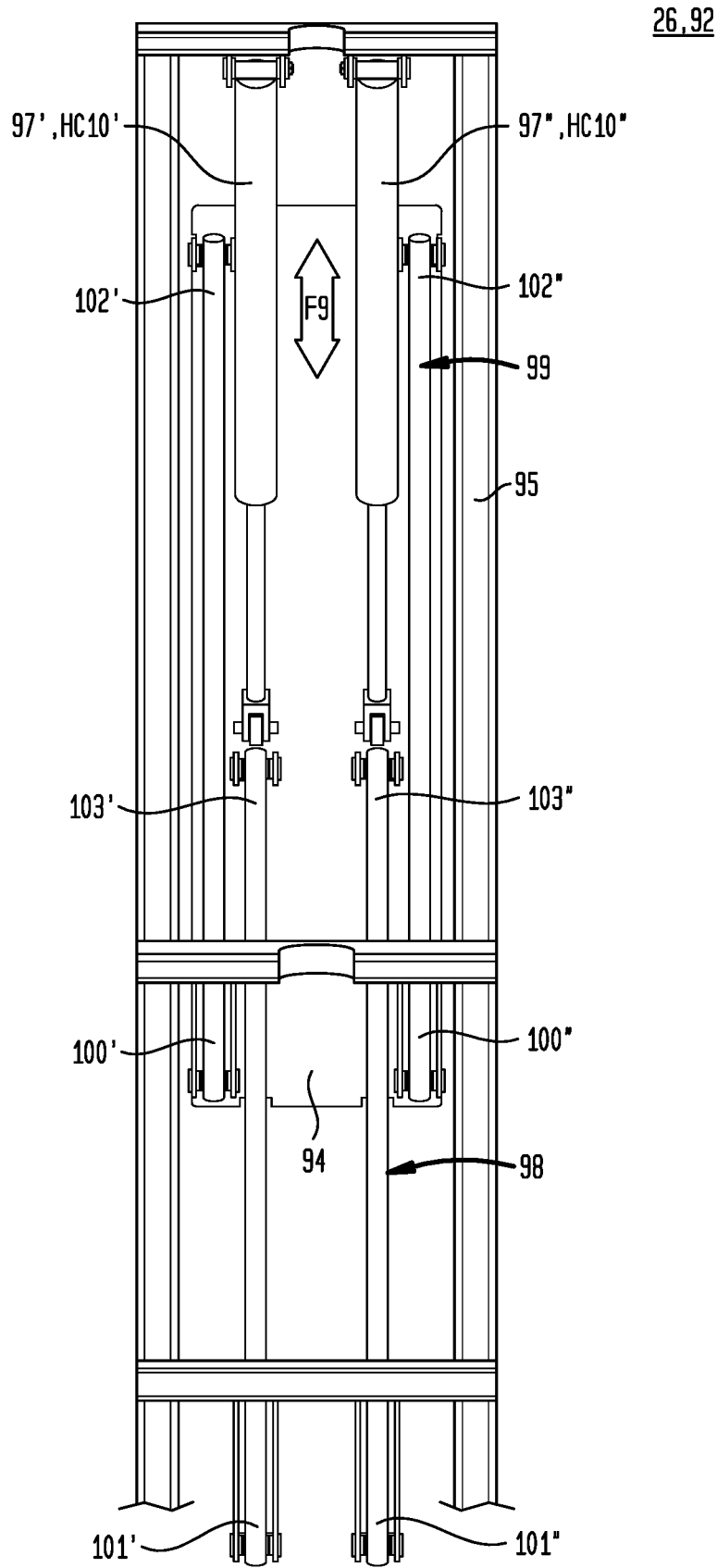
FIG. 39 is a bottom plan view of a particular embodiment of a bale push off.
Figure 40:
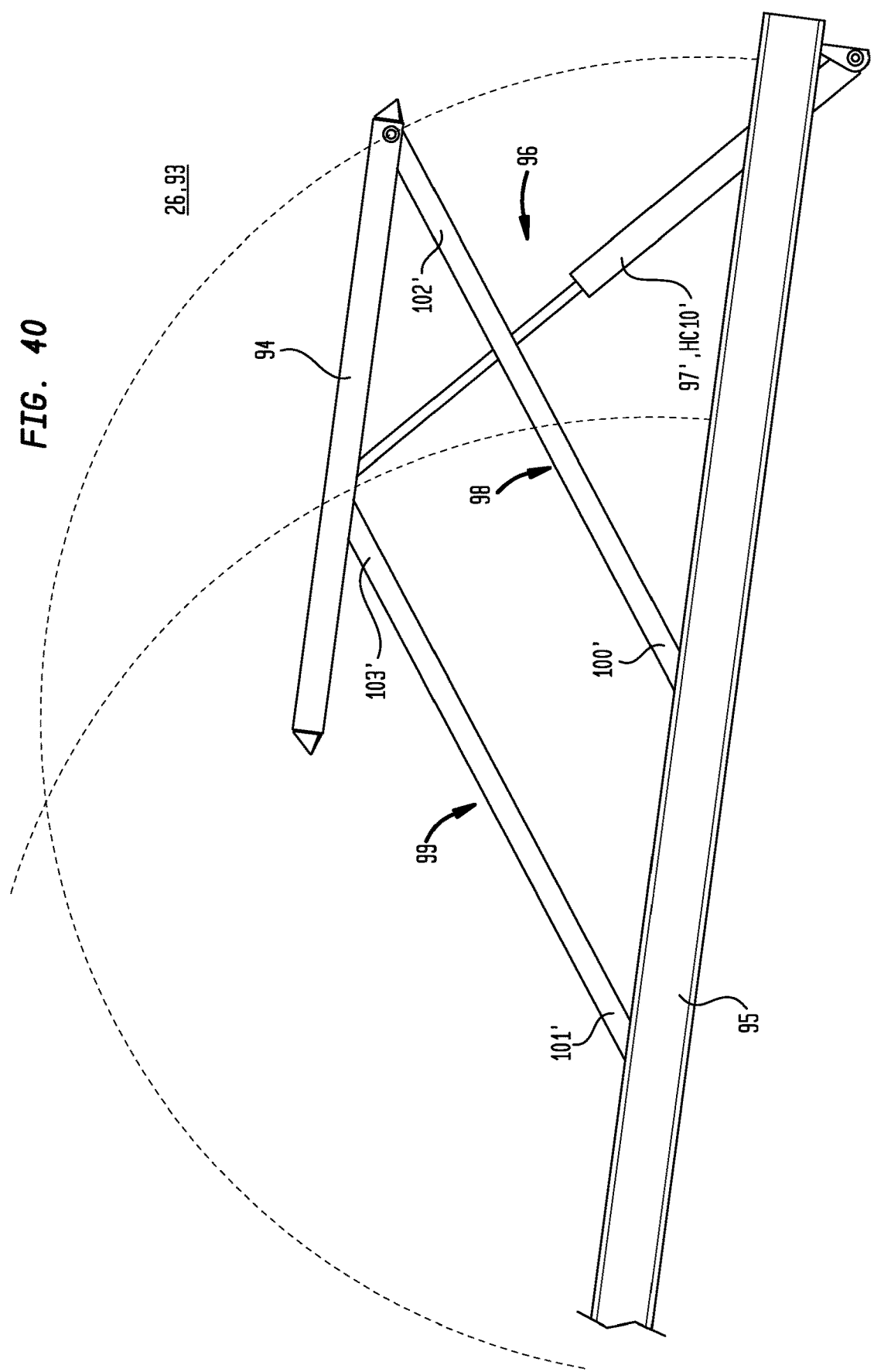
FIG. 40 is a first side elevation view of a particular embodiment of a bale push off.
Figure 41:
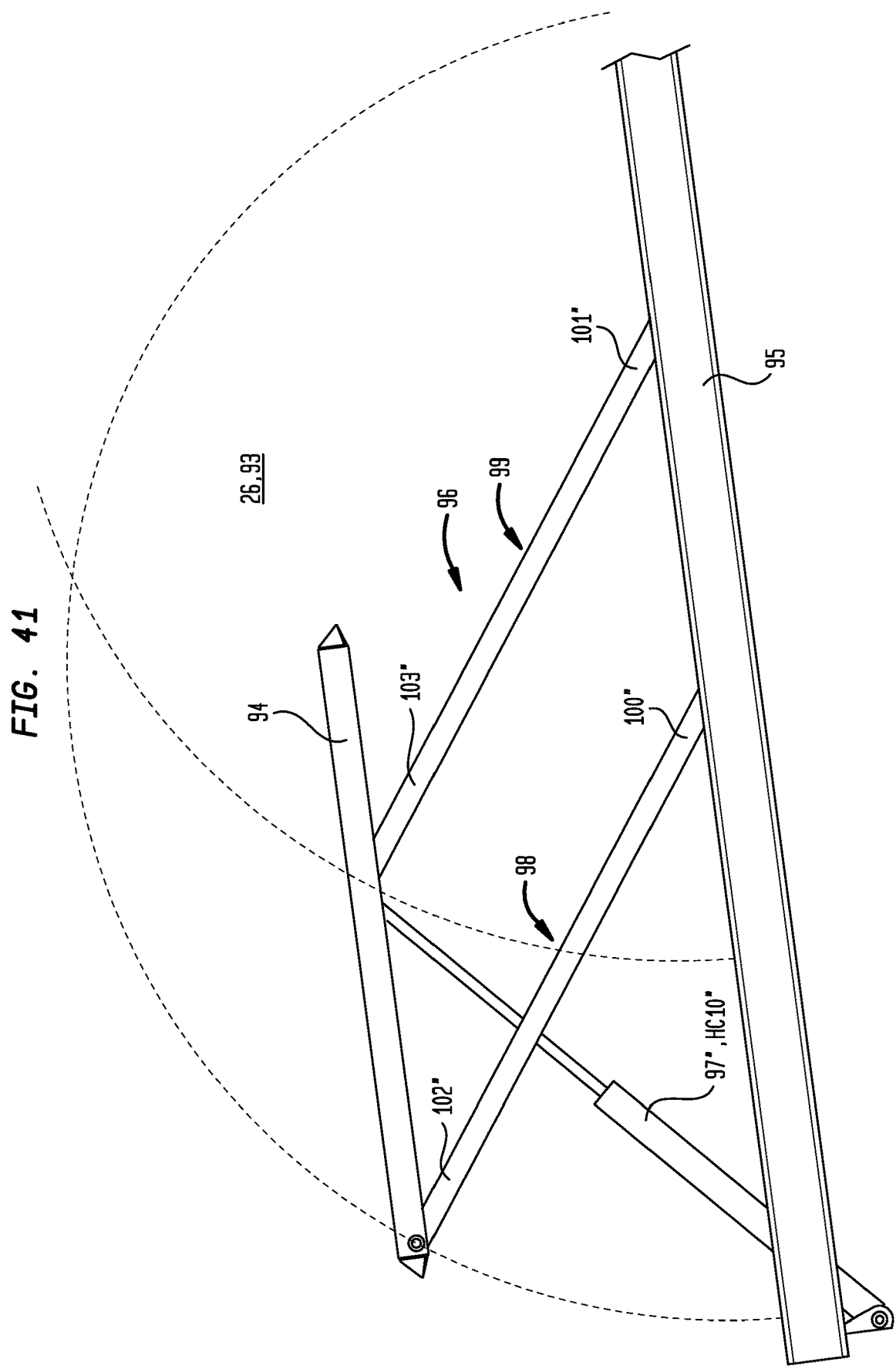
FIG. 41 is a second side elevation view of a particular embodiment of a bale push off.
Figure 42:
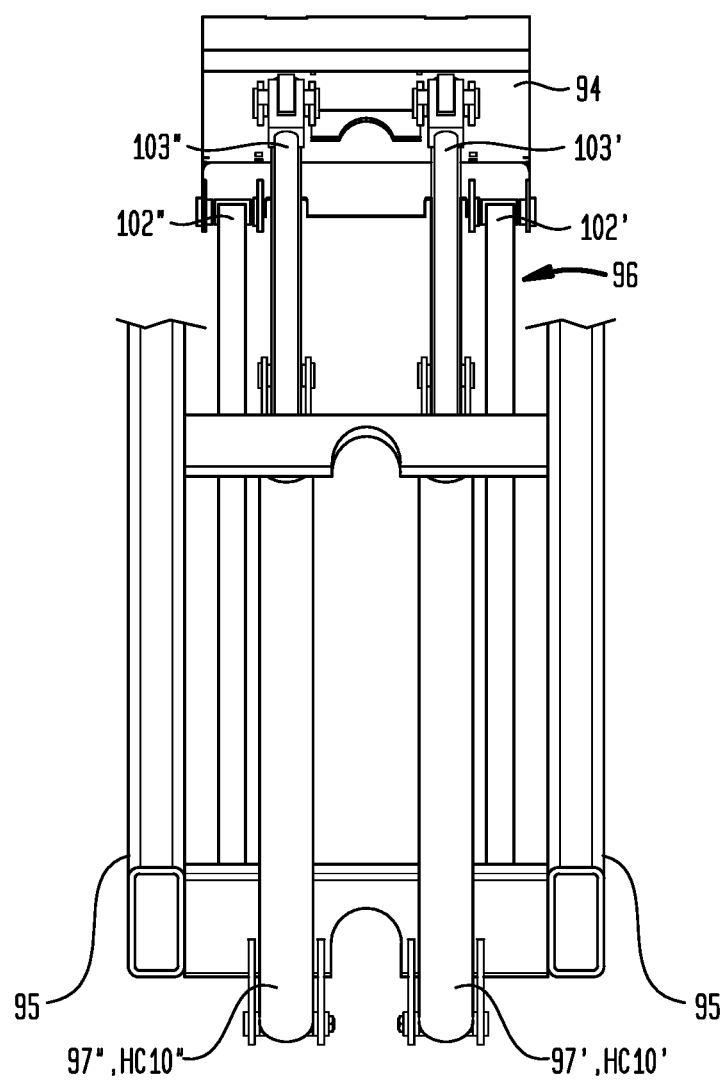
FIG. 42 is front end elevation view of a particular embodiment of a bale push off.
Figure 43:
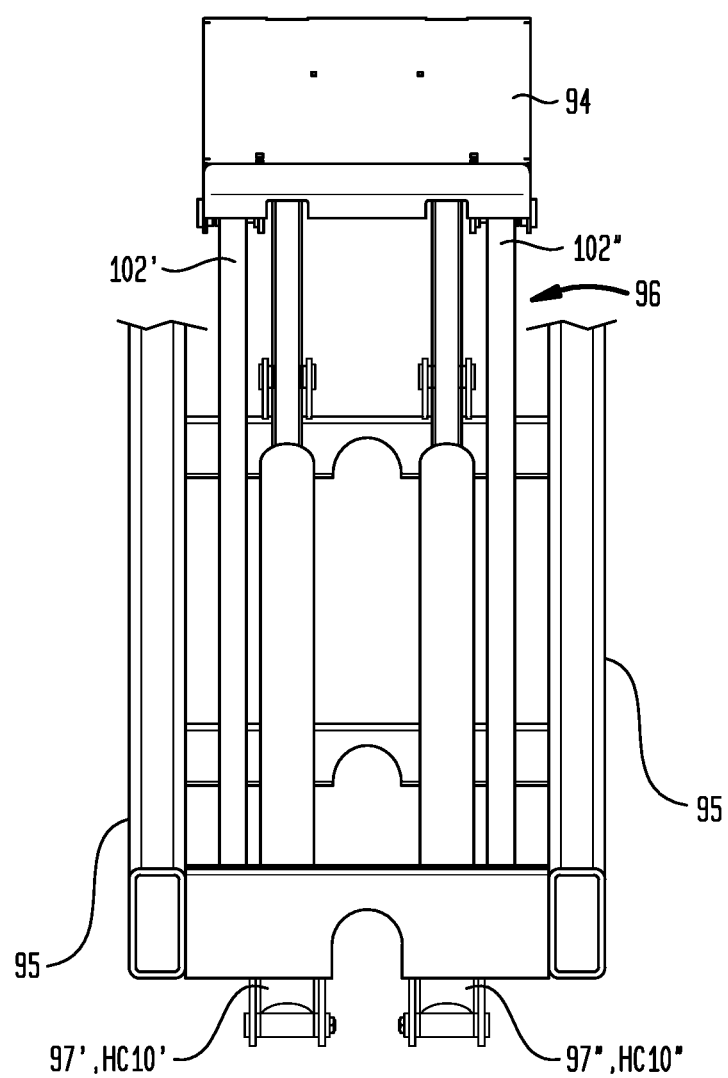
FIG. 43 is rear end elevation view of a particular embodiment of a bale push off.

Now, with primary reference to FIGS. 38 through 43, particular embodiments of the bale stacker (1) can, but need not necessarily, include a bale stack push off (26) coupled to the bale stack bed (24) operable between a retracted condition (92) (as shown in the examples of FIG. 38 through 39) and an extended condition (93) (as shown in FIGS. 40-43 and 59) to push bale stacks (3')(3" . . . ) off from the at least one fork or a pair of forks (71') (71") onto the surface (8) supporting the bale stacker (1)(as shown in the example of FIG. 59). As shown in the illustrative example of FIG. 26, in particular embodiments, the bale stack push off (26) can be disposed between the pair of fork carriages (72') (72") of the bale stacker bed (24) and medially between the bale stacker bed first end and the bale stack bed second end (68) (69) of the bale stack bed (24). In particular embodiments, the bale stack push off (26) can include a push off platform (94) disposed opposite a push off frame (95) and a lift assembly (96) arranged between the push off frame (95) and the push off platform (94) to displace the push off frame (95) and the push off platform (94) in relation to each other by the push pull force (F9) provided by a bale stack push off actuators (97')(97"), hydraulic cylinders (HC10')(HC10") to operate the lift assembly (96). In the illustrative example of FIG. 40, the lift assembly (96) includes two pairs of lift legs (98)(99) including lift leg first ends (100') (100") (101') (101") and lift leg second ends (102') (102") (103') (103") of each of the two pairs of lift legs (98) 99) to move towards or away from each other. To ensure that the push off platform (94) remains substantially parallel with the push off frame during operation (95), a first pair of the lift leg first leg ends (100') (100") can be connected to the push off frame (95) and the corresponding first pair of the lift leg second leg ends (102') (102") can be connected to the push off platform (94) respectively through spatially fixed rotatable joints (104). The second pair of the lift leg first ends (101')(101") of the push off frame (95) and the corresponding second pair of lift leg second ends (103') (103") of the push off platform (94) can be connected respectively through spatially fixed rotatable joints (105). The first pair of lift legs (98) and the second pair of lift legs (99) can have substantially equal length. The spatially fixed rotatable joints (104)(105) of the first and second pair of lift leg first and second end can be respectively coupled to the push off platform (94) and push off frame (95) a distance apart to allow the first and second pair of legs (98)(99) second ends (102')(102")(103')(103") to concurrently travel through respective arcs of substantially the same radius to maintain the platform (94) substantially parallel with the push off frame during operation (95) between the retracted condition (92) and the extended condition (93).

As can be easily understood from the foregoing, the basic concepts of the present invention may be embodied in a variety of ways. The invention involves numerous and varied embodiments of a bale stacker and methods for making and using such a bale stacker.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "stack" should be understood to encompass disclosure of the act of "stacking"—whether explicitly discussed or not—and, conversely, were there effectively disclosure of the act of "stacking", such a disclosure should be understood to encompass disclosure of a "stack" and even a "means for stacking". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the bale stackers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A bale lift adapted to pivotally couple to a chassis of a bale stacker said bale lift comprising:
   a pair of elongate lift arms adapted to pivotally couple in spaced apart relation to a bale stacker chassis by lift arm first ends and outwardly extending from said chassis front end to terminate in lift arm second ends, said pair of elongate lift arms rotatable from a primarily horizontal orientation to a primarily vertical orientation in relation to said bale stacker chassis;
   a bale gripper head, including:
      a bale gripper crosspiece rotatably coupled to said lift arm second ends of said pair of elongate lift arms;
      a pair of bale gripper arms each including one elongate bar, said pair of bale gripper arms having gripper arm first ends correspondingly pivotally coupled to opposite bale gripper crosspiece ends and outwardly extending from said bale gripper crosspiece ends to terminate in a gripper arm second ends, wherein;
      said bale gripper crosspiece rotatable to rotate said pair of bale gripper arms about said lift arm second ends;
      said pair of bale gripper arms rotatable to increase or decrease distance between said gripper arm second ends to grip a bale between said pair of gripper arms, and wherein;
   when said bale lift pivotally coupled to said chassis of said bale stacker, said bail lift upstream of a bail receiving platform over a cab, and a bale stack bed; a bale transfer table pivotably coupled to said chassis between said bale stack bed and said bail receiving platform.

2. A bale stacker, comprising:
   a bale receiving platform disposed over a bale stacker chassis, said bale receiving platform located to receive bales released from a pair of gripper arms over said bale receiving platform, said pair of bale gripper arms rotated to increase distance between second ends of said gripper arms to release said bale from said bale gripper arms to said bale receiving platform;
   a bale transfer table having a bale transfer table first end pivotally coupled to a bale stacker chassis of said bale stacker and extending in an angled relation to said bale stacker chassis, said bale transfer table receiving a plurality of bales from said bale receiving recceing platform, said plurality of bales sliding upon said bale transfer table into a bale stack, said bale transfer table second end rotatable to a primarily vertical orientation in relation to said bale stacker chassis to dispose said bale stack in primarily vertical relation to said chassis;
   a bale stack bed including a bale stack bed first end opposite a bale stack bed second end, said bale stack bed pivotally mounted proximate said bale stack bed first end to said bale stacker chassis to allow rotation of said bale stack bed between at an angle of about twenty degrees to said bale stacker chassis with said bale stack bed second end disposed proximate and above said bale transfer table first end to and angle of about ninety degrees to said bale stacker chassis;
   at least one fork disposed in generally orthogonal relation to said bale stack bed, said at least one fork movable between said bale stack bed first end and said bale stack bed second end;
   a bale shuffler including a pair of bale shuffler arms adapted to pivotally couple to opposite bale stacker chassis sides of a bale stacker chassis of a bale stacker, said pair of bale shuffler arms upwardly extending on opposite bale stack bed sides of a bale stack bed to terminate in bale shuffler arm second ends, said pair of bale shuffler arms pivotally coupled to opposite bale stacker chassis sides of said bale stacker each rotatable a pivot axis by operation of a hydraulic cylinder to decrease distance between said bale shuffler arm second ends, said bale shuffler arms when rotated, angled toward each other to engage opposite bale sides of a bale stack to align a plurality of bale end walls in said bale stack; wherein,
      said bale stack bed second end abutting said bale stack disposed on said bale stack transfer table provides a fulcrum on which said bale stack pivots as said bale transfer table moves toward said primarily vertical orientation to dispose said bale stack proximate said bale stack bed second end;
   said bale stack disposed on said bale stack bed abutting said at least one fork; and,
   said bale shuffler further comprising a plurality of bale shuffler cross members coupled in spaced apart angled relation to each of said pair of bale shuffler arms, said plurality of bale shuffler cross members adapted to correspondingly engage a pair of bale stacks disposed on said bale stack bed to align bale stack sides of said pair of bale stacks.

* * * * *